United States Patent [19]
Calvert et al.

[11] Patent Number: 5,553,290
[45] Date of Patent: Sep. 3, 1996

[54] SOFTWARE PACKAGING STRUCTURE HAVING HIERARCHICAL REPLACEABLE UNITS

[75] Inventors: Nathaniel Calvert; James S. Effle; David L. Johnston; James L. Naylor; Helen M. Olson-Williams; Robert H. Satin; Dennis L. Shaffer; Gary A. Turk, all of Rochester, Minn.

[73] Assignee: International Business Machines Corporation, Armonk, N.Y.

[21] Appl. No.: 34,449

[22] Filed: Apr. 23, 1993

Related U.S. Application Data

[62] Division of Ser. No. 122,293, Nov. 18, 1987, Pat. No. 5,237,688.

[51] Int. Cl.$^6$ .................................................. G06F 9/44
[52] U.S. Cl. .................................. 395/700; 364/DIG. 1; 364/280; 364/286
[58] Field of Search .................................... 395/700

[56] References Cited

U.S. PATENT DOCUMENTS

| | | | |
|---|---|---|---|
| 4,014,005 | 3/1977 | Fox et al. | 340/172.5 |
| 4,024,504 | 5/1977 | Chowning et al. | 340/172.5 |
| 4,025,906 | 5/1977 | Riikonen | 340/172.5 |
| 4,195,344 | 3/1980 | Yamazaki | 364/200 |
| 4,468,728 | 8/1984 | Wang | 364/200 |
| 4,468,732 | 8/1984 | Raver | 364/200 |
| 4,558,413 | 12/1985 | Schmidt et al. | 364/300 |
| 4,595,981 | 6/1986 | Leung | 364/300 |
| 4,611,298 | 9/1986 | Schuldt | 364/900 |
| 4,622,633 | 11/1986 | Ceccon et al. | 364/200 |
| 4,633,392 | 12/1986 | Vicent et al. | 364/200 |
| 4,649,480 | 3/1987 | Ohki et al. | 364/300 |
| 4,656,583 | 4/1987 | Auslander et al. | 364/300 |
| 4,694,396 | 9/1987 | Weisshaar et al. | 364/300 |
| 4,719,564 | 1/1988 | Hraa | 364/200 |
| 4,751,635 | 6/1988 | Kret | 364/200 |
| 4,791,550 | 12/1988 | Stevenson et al. | 364/200 |
| 4,809,170 | 2/1989 | Leblang et al. | 364/200 |

OTHER PUBLICATIONS

Nicolas et al, "VM/Software Engineering", pp. 453–458, Electrical Communication, vol. 61, No. 4, Feb. 26, 1987.
Tsuboi et al, "Reuse Technolgies for Switching Software", IEEE/IEICE Global Telecommunications Conference, vol. 3/3, Nov. 15, 1987, pp. 1521–1525.
Mittermeir et al, "Software Bases for the Flexible Composition of Application Systems," IEEE Transactions of Software Engineering, vol. SE–13, No. 4, Apr. 1987, pp. 440–460.
IBM Technical Disclosure Bulletin, vol. 14, No. 1, Jun. 1971, pp. 306–311.
Turbo Pascal Release 4.0, Borland International, Introduction, Chapter 4 and Chapter 6, Oct. 1987.
Alto/Mesa 6.1 Documentation, Xerox Corporation, Apr. 1, 1982.

*Primary Examiner*—Kevin A. Kriess
*Attorney, Agent, or Firm*—Andrew J. Dillion

[57] ABSTRACT

A software management structure is disclosed. A software application package is made up of several linked replaceable units (RU). Each RU is serviceable without adversely effecting the other RUs. The RUs are linked together in a hierarchical fashion in a series of levels. In the preferred embodiment, five levels are used: Application Group level (AG), Loadable Code Group level (LCG), Primary Functional Group level (PFG), Secondary Functional Group level (SFG), and Operational Code Group level (OCG). The AG level defines a group of computer programs combined to perform a high level application tailor fit to meet the needs of the user. The LCG level defines individual programs each created to perform a general task. The PFG level refines the common programs defined in the LCG level to a more specific set of primary functions. The SFG level refines the primary functions defined in the PFG level to an even more specialized set of secondary functions tailored closely to fit a specific user's needs. The OCG level contains the operational code needed to run the specialized user application package defined by the preceding four levels.

13 Claims, 33 Drawing Sheets

FIG. 2B.
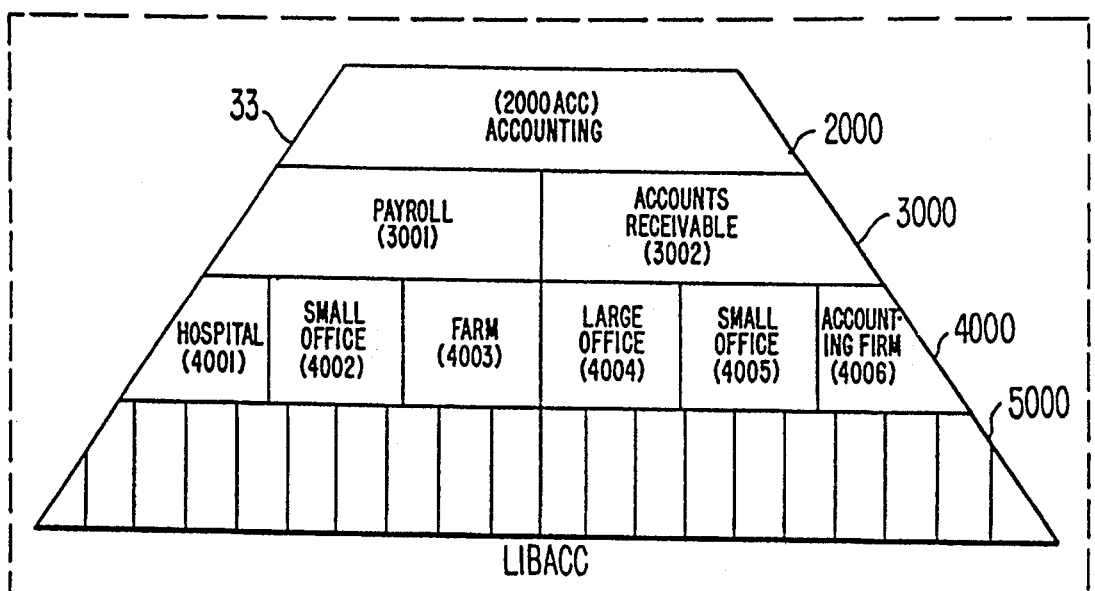
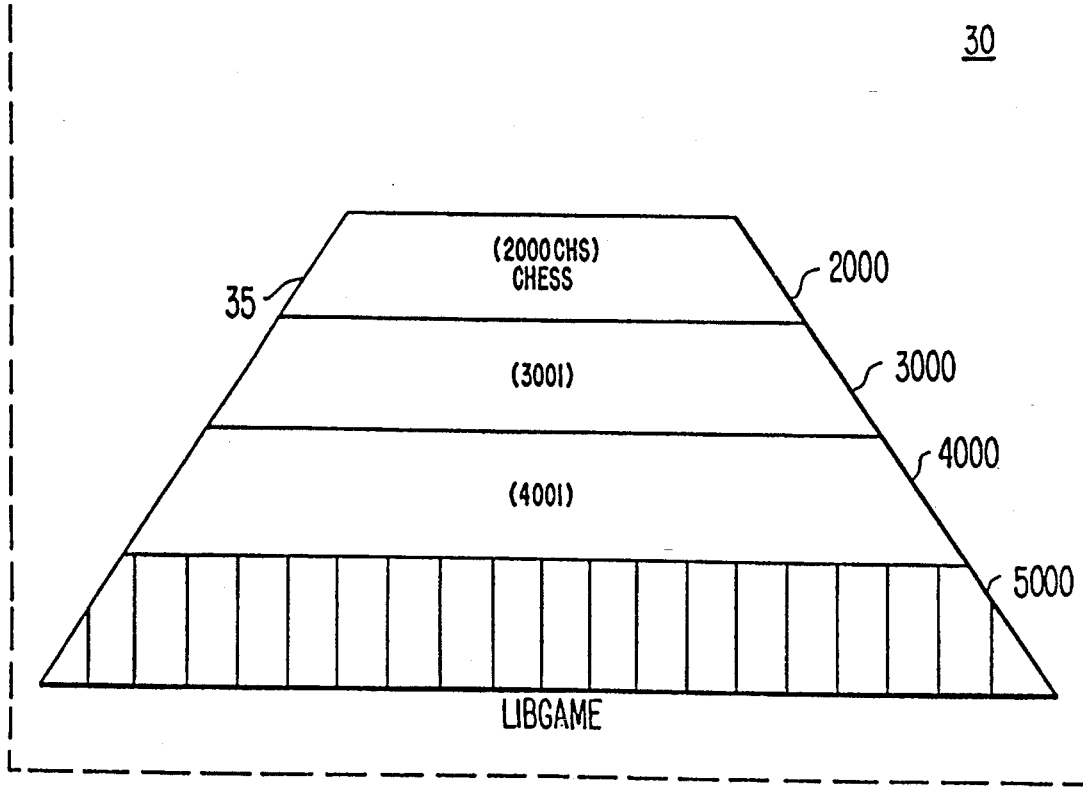

FIG. 7.

FIXED HEADER 200

| | LENGTH | REQUIRED | FIELD ATTRIBUTE |
|---|---|---|---|
| TOTAL LENGTH OF RU | 4 | Y | B----221 |
| LENGTH OF BODY | 4 | Y | B----222 |
| RESERVED | 8 | N | B----238 |
| RU NAME | 8 | Y | C----231 |
| RU REFERENCE ID | 4 | Y | C----232 |
| RU LOAD ID | 8 | N | C----233 |
| RESERVED | 1 | N | C----239 |
| LCG OR AG ID | 7 | Y | C----234 |
| PFG ID | 4 | Y | C----236 |
| SFG ID | 4 | Y | C----237 |
| RU INSTRUCTION SET | 4 | N | B----241 |
| RU CONTROL INFORMATION | 4 | Y | C----242 |
| RU DEVELOPMENT INFORMATION | 4 | Y | C----243 |
| RU CREATE DATE | 8 | Y | C----244 |
| RU CREATE TIME | 6 | Y | C----246 |
| RU INSTALL DATE | 8 | Y | C----247 |
| RU INSTALL TIME | 6 | Y | C----248 |
| RU VERSION LEVEL | 4 | Y | C----249 |
| RU RELEASE/MODIFICATION LEVEL | 4 | Y | C----250 |
| RESERVED | 1 | N | C----251 |
| RU TEMPORARY FIX ID | 7 | N | C----252 |
| RESERVED | 1 | N | C----255 |
| RU PATCH ID | 7 | N | C----253 |
| RESERVED | 8 | N | C----256 |
| RU COMPILER'S NAME | 10 | N | C----257 |
| RU COMPILER'S RELEASE/MODIFICATION LEVEL | 4 | N | C----258 |
| RU COMMON NAME | 8 | N | B----254 |
| OFFSET TO RU BODY | 4 | Y | B----261 |
| OFFSET TO RU EMBEDDED VPD | 4 | N | B----267 |
| OFFSET TO RU SYSTEM SPECIFIC DATA | 4 | Y | B----262 |
| OFFSET TO RU HARDWARE DEPENDENCY LIST | 4 | N | B----263 |
| OFFSET TO RU SOFTWARE DEPENDENCY LIST | 4 | N | B----264 |
| OFFSET TO RU SPECIFIC INFORMATION | 4 | N | B----265 |
| RESERVED | 4 | N | C----268 |
| NAME OF SYSTEM AREA WHICH CONTAINS RU | 8 | N | B----266 |
| RESERVED | 8 | N | B----269 |
| RU MODIFICATION DATE | 8 | N | C----270 |
| RU MODIFICATION TIME | 6 | N | C----271 |
| OFFSET TO HEADER EXTENSION | 4 | N | B----272 |
| RESERVED | 2 | N | B----273 |

FIG. 8.

VARIABLE HEADER    300

| Field | LENGTH | REQUIRED | FIELD ATTRIBUTE |
|---|---|---|---|
| LENGTH OF SYSTEM SPECIFIC DATA | 4 | Y | B----321 |
| START OF SYSTEM SPECIFIC DATA | * | Y | C----322 |
| SIZE OF HARDWARE DEPENDENCY LIST | 4 | Y | B----338 |
| NUMBER OF ENTRIES IN HARDWARE DEPENDENCY LIST | 4 | Y | B----331 |
| RESERVED | 2 | N | B----339 |
| RU HARDWARE CORRELATION ID | 2 | N | C----333 |
| HARDWARE TYPE | 4 | Y | C----333 |
| RESERVED | 1 | N | B----334 |
| HARDWARE MODEL | 3 | N | C----335 |
| HARDWARE LEVEL/LOAD ID | 4 | N | C----336 |
| HARDWARE PART NUMBER | 12 | N | C----337 |
| SIZE OF SOFTWARE DEPENDENCY LIST | 4 | Y | B----361 |
| NUMBER OF ENTRIES IN SOFTWARE DEPENDENCY LIST | 4 | Y | B----362 |
| SIZE OF ENTRY | 4 | Y | B----363 |
| SOFTWARE CORRELATION ID | 2 | N | C----364 |
| RESERVED | 1 | N | B----365 |
| SOFTWARE DEPENDENCY TYPE | 2 | N | C----366 |
| LCG ID | 1 | Y | C----367 |
| LCG VERSION LEVEL | 4 | Y | C----368 |
| LCG RELEASE/MODIFICATION LEVEL | 4 | Y | C----369 |
| LCG-PFG ID | 4 | N | B----370 |
| LCG-PFG VERSION LEVEL | 4 | N | C----371 |
| LCG-PFG RELEASE/MODIFICATION LEVEL | 4 | N | C----372 |
| PFG-SFG ID | 4 | N | B----373 |
| PFG-SFG VERSION LEVEL | 4 | N | C----374 |
| PFG-SFG RELEASE/MODIFICATION LEVEL | 4 | N | C----375 |
| PFG-SFG INTERIM PC LEVEL | 4 | N | C----376 |
| LENGTH OF HEADER EXTENSION | 4 | N | B----381 |
| RU PART NUMBER | 12 | N | C----382 |
| RU SHORT DESCRIPTION | 32 | N | C----383 |
| RU LONG DESCRIPTION | 60 | N | C----384 |
| LENGTH OF RU SPECIFIC INFORMATION | 4 | Y | B----385 |
| START OF RU SPECIFIC INFORMATION | * | Y | C----386 |

FIG. 9.

FIXED AG INFORMATION 1400

| | LENGTH | REQUIRED | FIELD ATTRIBUTE |
|---|---|---|---|
| TOTAL LENGTH OF AG BODY | 4 | Y | B----1420 |
| VENDOR NAME | 52 | Y | C----1431 |
| VENDOR ID | 12 | Y | C----1432 |
| VENDOR ADDRESS | 52 | N | C----1433 |
| VENDOR CITY | 32 | N | C----1434 |
| VENDOR STATE/PROVINCE | 20 | N | C----1435 |
| VENDOR COUNTRY | 32 | N | C----1436 |
| VENDOR POST OFFICE CODE | 20 | N | C----1437 |
| CARRIER ACCESS CODE | 16 | N | C----1438 |
| VENDOR TELEPHONE NUMBER | 16 | N | C----1439 |
| AG CHARACTER CONSTANT | 4 | Y | C----1441 |
| RESERVED | 5 | N | B----1442 |
| AG ID | 7 | Y | C----1443 |
| AG PART NUMBER | 12 | Y | C----1444 |
| AG VERSION LEVEL | 4 | Y | C----1445 |
| AG RELEASE/MODIFICATION LEVEL | 4 | Y | C----1446 |
| AG INTERIM PROGRAMMING CHANGE LEVEL | 4 | Y | C----1447 |
| AG TEMPORARY FIX PREFIX ID | 2 | Y | C----1448 |
| COPYRIGHT INFORMATION | 64 | N | C----1449 |
| RESERVED | 4 | N | B----1461 |
| RESERVED | 4 | N | B----1462 |
| OFFSET TO LCG LIST | 4 | N | B----1463 |
| OFFSET TO AG SPECIFIC INFORMATION | 4 | N | B----1464 |
| RESERVED | 22 | N | B----1465 |

FIG. 10.

VARIABLE AG INFORMATION 1500

| | LENGTH | REQUIRED | FIELD ATTRIBUTE |
|---|---|---|---|
| LENGTH OF AG SPECIFIC DATA | 4 | N | B----1521 |
| START OF AG SPECIFIC DATA | * | N | C----1522 |
| SIZE OF LCG LIST | 4 | Y | B----1541 |
| RESERVED | 8 | N | B----1542 |
| NUMBER OF LCG ENTRIES IN AG LIST | 4 | Y | B----1543 |
| SELECT/OMIT | 1 | N | B----1545 |
| LCG AVAILABILITY FIELD | 1 | Y | C----1546 |
| LCG INSTALLED | 1 | Y | C----1547 |
| LCG ENABLED | 1 | N | C----1548 |
| RESERVED | 6 | N | B----1549 |
| SYSTEM LOCATION THAT CONTAINS LCG | 10 | Y | C----1550 |
| RESERVED | 6 | N | B----1551 |
| LCG NAME | 10 | Y | C----1552 |
| RESERVED | 5 | N | B----1553 |
| LCG ID | 7 | Y | C----1554 |
| LCG VERSION LEVEL | 4 | Y | C----1555 |
| LCG RELEASE/MODIFICATION LEVEL | 4 | Y | C----1556 |

FIG. 11.

FIXED LCG INFORMATION 2400

| | LENGTH | REQUIRED | FIELD ATTRIBUTE |
|---|---|---|---|
| TOTAL LENGTH OF LCG BODY | 4 | Y | B----2420 |
| VENDOR NAME | 52 | Y | C----2431 |
| VENDOR ID | 12 | Y | C----2432 |
| VENDOR ADDRESS | 52 | N | C----2433 |
| VENDOR CITY | 32 | N | C----2434 |
| VENDOR STATE/PROVINCE | 20 | N | C----2435 |
| VENDOR COUNTRY | 32 | N | C----2436 |
| VENDOR POST OFFICE CODE | 20 | N | C----2437 |
| CARRIER ACCESS CODE | 16 | N | C----2438 |
| VENDOR TELEPHONE NUMBER | 16 | N | C----2439 |
| LCG CHARACTER CONSTANT | 4 | N | C----2440 |
| RESERVED | 5 | N | B----2441 |
| LCG ID | 7 | Y | C----2450 |
| LCG PART NUMBER | 12 | N | C----2451 |
| LCG VERSION LEVEL | 4 | Y | C----2452 |
| LCG RELEASE/MODIFICATION LEVEL | 4 | Y | C----2453 |
| LCG INTERIM PROGRAMMING CHANGE LEVEL | 4 | Y | C----2454 |
| LCG TEMPORARY FIX PREFIX ID | 2 | Y | C----2455 |
| COPYRIGHT INFORMATION | 64 | Y | C----2456 |
| RESERVED | 4 | N | B----2461 |
| RESERVED | 4 | N | B----2462 |
| OFFSET TO PFG LIST | 4 | N | B----2463 |
| OFFSET TO LCG SPECIFIC INFORMATION | 4 | N | B----2464 |
| OFFSET TO EXIT PROGRAMS | 4 | N | B----2467 |
| OFFSET TO AG DATA | 4 | N | B----2465 |
| RESERVED | 14 | N | B----2466 |

FIG. 12.

VARIABLE LCG INFORMATION 2500

| | LENGTH | REQUIRED | FIELD ATTRIBUTE | |
|---|---|---|---|---|
| LENGTH OF LCG SPECIFIC DATA | 4 | N | B | 2521 |
| START OF LCG SPECIFIC DATA | * | N | C | 2522 |
| AG ID | 7 | N | C | 2531 |
| AG NAME | 16 | N | C | 2532 |
| AG LOCATION | 16 | N | C | 2533 |
| SIZE OF PFG LIST | 4 | Y | B | 2541 |
| RESERVED | 8 | N | B | 2542 |
| NUMBER OF ENTRIES IN LIST | 4 | Y | B | 2543 |
| SELECT/OMIT | 1 | N | B | 2544 |
| PFG AVAILABILITY FIELD | 1 | Y | C | 2545 |
| PFG INSTALLED | 1 | N | C | 2546 |
| PFG ENABLED | 1 | N | C | 2547 |
| SYSTEM LOCATION THAT CONTAINS PFG | 8 | Y | C | 2548 |
| RESERVED | 8 | N | B | 2549 |
| PFG NAME | 8 | Y | C | 2550 |
| RESERVED | 8 | N | B | 2551 |
| PFG ID | 4 | Y | C | 2552 |
| PFG VERSION LEVEL | 4 | Y | C | 2553 |
| PFG RELEASE/MODIFICATION LEVEL | 4 | Y | C | 2554 |
| NAME OF PRE-SAVE PROGRAM | 16 | N | C | 2561 |
| LOCATION OF PRE-SAVE PROGRAM | 16 | N | C | 2562 |
| NAME OF POST-SAVE PROGRAM | 16 | N | C | 2563 |
| LOCATION OF POST-SAVE PROGRAM | 16 | N | C | 2564 |
| NAME OF PRE-RESTORE PROGRAM | 16 | N | C | 2565 |
| LOCATION OF PRE-RESTORE PROGRAM | 16 | N | C | 2566 |
| NAME OF RECOVERY PROGRAM | 16 | N | C | 2567 |
| LOCATION OF RECOVERY PROGRAM | 16 | N | C | 2568 |
| EXIT PROGRAM COMPLETION CODES | 2 | N | B | 2569 |

FIG. 13.

FIXED PFG INFORMATION 3400

| | LENGTH | REQUIRED | FIELD ATTRIBUTE | |
|---|---|---|---|---|
| Total Length of PFG Body | 4 | Y | B | 3420 |
| PFG Character Constant | 4 | Y | C | 3431 |
| PFG ID | 4 | Y | C | 3432 |
| Reserved | 5 | N | B | 3433 |
| LCG ID | 7 | N | C | 3434 |
| PFG Part Number | 12 | N | C | 3435 |
| PFG Version Level | 4 | Y | C | 3436 |
| PFG Release/Modification Level | 4 | N | C | 3437 |
| PFG Interim Programming Change Level | 4 | Y | C | 3438 |
| PFG Temporary Fix Prefix ID | 2 | N | C | 3439 |
| Copyright Information | 64 | Y | C | 3450 |
| Offset to Hardware Dependency List | 4 | N | B | 3461 |
| Offset to Software Dependency List | 4 | N | B | 3462 |
| Offset to SFG List | 4 | Y | B | 3463 |
| Offset to PFG Specific Information | 4 | N | B | 3464 |
| Reserved | 14 | N | B | 3465 |

FIG. 14.

VARIABLE PFG INFORMATION 3500

| | LENGTH | REQUIRED | FIELD ATTRIBUTE | |
|---|---|---|---|---|
| Length of PFG Specific Data | 4 | N | B | 3521 |
| Start of PFG Specific Data | * | N | C | 3522 |
| Size of SFG List | 4 | Y | B | 3541 |
| Reserved | 8 | N | B | 3542 |
| Number of Entries in List | 4 | Y | B | 3543 |
| Select/Omit | 1 | Y | B | 3544 |
| SFG Availability Field | 1 | Y | C | 3545 |
| SFG Installed | 1 | N | C | 3546 |
| SFG Enabled | 1 | N | C | 3547 |
| System Location that Contains SFG | 8 | Y | C | 3548 |
| Reserved | 8 | N | B | 3549 |
| SFG Name | 8 | Y | C | 3550 |
| Reserved | 8 | N | B | 3551 |
| SFG ID | 4 | Y | C | 3552 |
| SFG Version Level | 4 | Y | C | 3553 |
| SFG Release/Modification Level | 4 | Y | C | 3554 |

FIG. 15.

FIXED SFG INFORMATION 4400

| | LENGTH | REQUIRED | FIELD ATTRIBUTE | |
|---|---|---|---|---|
| Total Length of SFG Body | 4 | Y | B | 4421 |
| SFG Character Constant | 4 | Y | C | 4422 |
| SFG ID | 4 | Y | C | 4431 |
| Reserved | 5 | N | B | 4432 |
| SFG-LCG ID | 7 | Y | C | 4433 |
| SFG-PFG ID | 4 | Y | B | 4434 |
| SFG Part Number | 12 | N | C | 4435 |
| SFG Version Level | 4 | Y | C | 4436 |
| SFG Release/Modification Level | 4 | N | C | 4437 |
| SFG Interim Programming Change Level | 4 | N | C | 4438 |
| SFG Temporary Fix Prefix ID | 2 | N | C | 4439 |
| Copyright Information | 64 | N | C | 4440 |
| Offset to Hardware Dependency List | 4 | N | B | 4465 |
| Offset to Software Dependency List | 4 | N | B | 4466 |
| Offset to OCG List | 4 | Y | B | 4461 |
| Offset to SFG Temporary Fix/Patch Activity | 4 | N | B | 4462 |
| Offset to SFG Specific Information | 4 | N | B | 4463 |
| Reserved | 22 | N | B | 4464 |

FIG. 16.

VARIABLE SFG INFORMATION 4500

| | LENGTH | REQUIRED | FIELD ATTRIBUTE | |
|---|---|---|---|---|
| Length of SFG Specific Data | 4 | Y | B | 4520 |
| Start of SFG Specific Data | * | N | C | 4521 |
| Size of OCG List | 4 | Y | B | 4541 |
| Number of System Location Entries | 4 | Y | B | 4542 |
| Size of this System Location List | 4 | Y | B | 4543 |
| System Location that Contains OCG | 8 | Y | C | 4544 |
| Reserved | 8 | N | B | 4545 |
| Number of OCG Entries in List | 4 | Y | B | 4546 |
| OCG Name | 16 | Y | C | 4547 |
| Secondary OCG Identifier | 2 | N | B | 4548 |
| OCG Version Level | 4 | Y | C | 4549 |
| OCG Release/Modification Level | 4 | Y | C | 4550 |
| Reserved | 1 | N | B | 4551 |
| OCG Temporary Fix Identifier | 7 | N | C | 4552 |
| Reserved | 1 | N | B | 4553 |
| OCG Patch Identifier | 7 | N | C | 4554 |
| Size of Temporary Fix/Patch Activity Area | 4 | Y | B | 4561 |
| Offset to Patch Activity | 4 | N | B | 4562 |
| Number of Installed Temporary Fix Entries | 4 | N | B | 4563 |
| Reserved | 1 | N | B | 4564 |
| First Installed Temporary Fix ID | 7 | N | C | 4565 |
| Status of Temporary Fix | 4 | N | B | 4566 |
| Number of Installed Patch Entries | 4 | N | B | 4567 |
| Reserved | 1 | N | B | 4568 |
| First Installed Patch ID | 7 | N | C | 4569 |
| Status of Patch | 4 | N | B | 4570 |

FIG. 17.

PROGRAM DEVELOPER PACKAGING TOOLS

```
11000   DEFINE PROGRAM PACKAGE

17000   DISPLAY PROGRAM PACKAGE
```

FIG. 32.

APPLICATION DEVELOPER PACKAGING TOOLS

```
21000   DEFINE APPLICATION PACKAGE

24000   SELECT APPLICATION GROUP FUNCTIONS

27000   DISPLAY APPLICATION PACKAGE
```

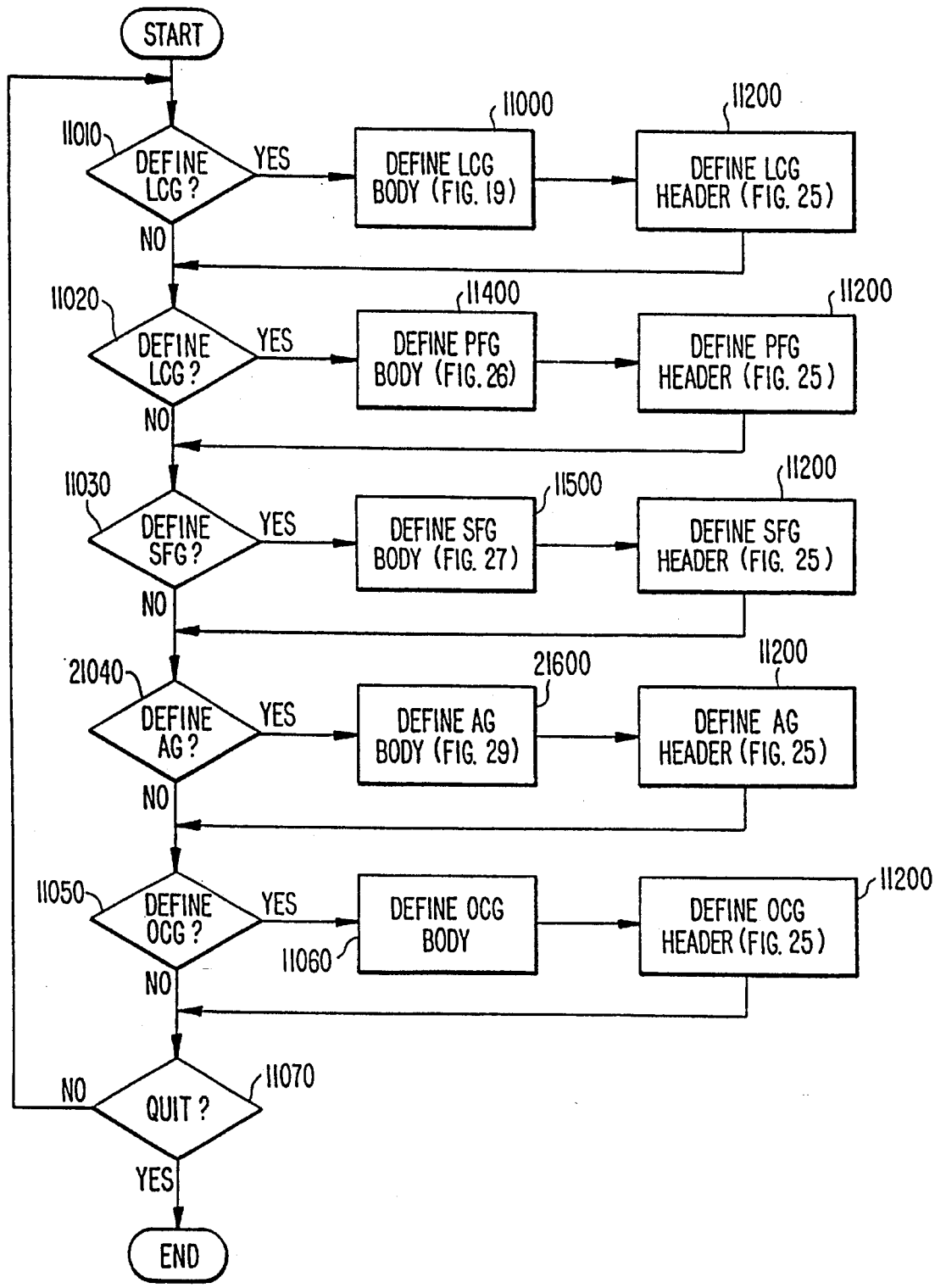

DEFINE LCG BODY 11100

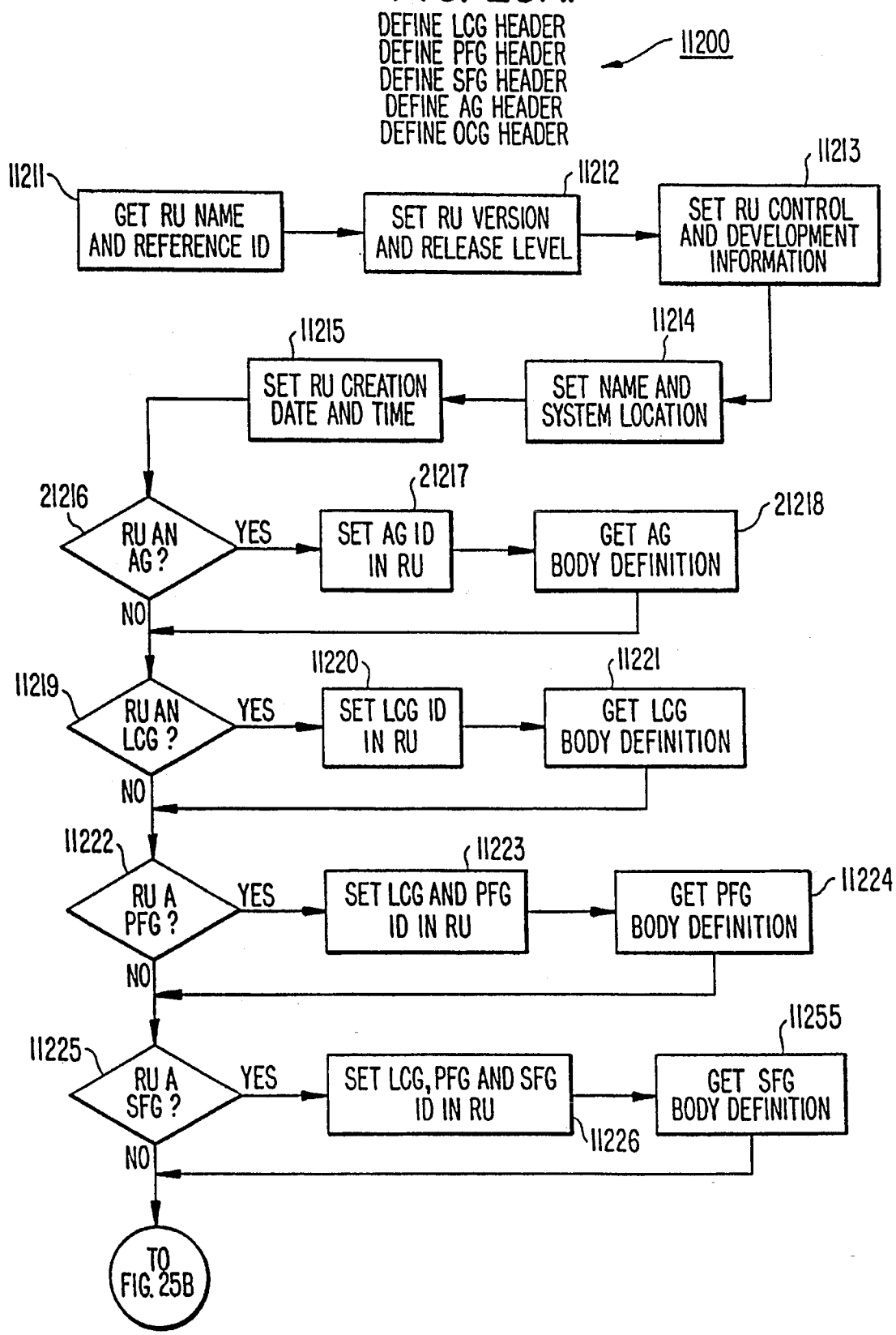

FIG. 31.

DISPLAY PROGRAM PACKAGE 17000

| 17050 DESCRIPTION | 17100 LCG ID | 17200 PFG ID | 17300 SFG ID | 17400 RU NAME | 17500 RU TYPE | 17600 LOCATION | 17700A | 17780I | 17790E |
|---|---|---|---|---|---|---|---|---|---|
| OPERATING SYSTEM | 2000SS1 | | | L2000SS1 | LCG | LIBSYS | X | X | X |
| BASIC SUPPORT | 2000SS1 | 3001 | | P3001SS1 | PFG | LIBSYS | X | X | X |
| HARD DISK | 2000SS1 | 3001 | 4001 | S4001SS1 | SFG | LIBSYS | X | X | X |
| OPTICAL DISK | 2000SS1 | 3001 | 4002 | S4002SS1 | SFG | LIBSYS | X | X | X |
| LOCAL AREA NET | 2000SS1 | 3002 | | P3002SS1 | PFG | LIBLANS | X | X | X |
| PC NETWORK | 2000SS1 | 3002 | 4003 | S4003SS1 | SFG | LIBLANS | X | X | X |
| TOKEN RING | 2000SS1 | 3002 | 4004 | S4004SS1 | SFG | LIBLANS | | X | X |
| COMMUNICATIONS | 2000SS1 | 3003 | | P3003SS1 | PFG | LIBCAS | X | X | |
| WINDOWING | 2000SS1 | 3003 | 4005 | S4005SS1 | SFG | | X | | |
| SPLIT SCREEN | 2000SS1 | 3001 | 4006 | S4006SS1 | | LIBCAS | X | X | |
| COMMUNICATIONS | 2000CM1 | | | L2000CM1 | LCG | LIBUTL | X | X | X |
| HOST TO PC | 2000CM1 | 3001 | | P3001CM1 | PFG | LIBUTL | X | X | X |
| COAXIAL CABLE | 2000CM1 | 3001 | 4001 | S4001CM1 | SFG | LIBUTL | X | | X |
| PHONE LINE | 2000CM1 | 3001 | 4002 | S4002CM1 | SFG | LIBUTL | X | X | X |
| UP/DOWN LOAD | 2000CM1 | 3001 | 4003 | S4003CM1 | SFG | | X | | |
| LOCAL AREA NET | 2000CM1 | 3002 | | P3002CM1 | PFG | LIBUTL | X | X | |
| PC NETWORK | 2000CM1 | 3002 | 4004 | S4004CM1 | SFG | LIBUTL | X | X | |
| TOKEN RING | 2000CM1 | 3002 | 4005 | S4005CM1 | SFG | LIBUTL | X | X | |
| WORD PROCESSING | 2000WP1 | | | L2000WP1 | LCG | LIBUTL | X | X | X |
| DOCUMENT PREP | 2000WP1 | 3001 | | P3001WP1 | PFG | LIBUTL | X | X | X |
| TABLE OF CONTENT | 2000WP1 | 3001 | 4001 | S4001WP1 | SFG | LIBUTL | X | X | X |
| INDEX | 2000WP1 | 3001 | 4002 | S4002WP1 | SFG | LIBUTL | X | X | X |
| FANCY PRINTING | 2000WP1 | 3001 | 4003 | S4003WP1 | SFG | LIBUTL | X | X | X |
| SPELL CHECKER | 2000WP1 | 3002 | | P3002WP1 | PFG | LIBUTL | X | X | X |
| GENERAL WORDS | 2000WP1 | 3002 | 4004 | S4004WP1 | SFG | LIBUTL | X | X | X |
| MEDICAL WORDS | 2000WP1 | 3002 | 4005 | S4005WP1 | SFG | LIBUTL | X | X | X |
| LEGAL WORDS | 2000WP1 | 3002 | 4006 | S4006WP1 | SFG | LIBUTL | X | X | X |
| ACCOUNTING | 2000ACC | | | L2000ACC | LCG | LIBACC | X | X | X |
| PAYROLL | 2000ACC | 3001 | | P3001ACC | PFG | LIBACC | X | X | X |
| HOSPITAL | 2000ACC | 3001 | 4001 | S4001ACC | SFG | | X | X | |
| SMALL OFFICE | 2000ACC | 3001 | 4002 | S4002ACC | SFG | LIBACC | X | X | X |
| FARM | 2000ACC | 3001 | 4003 | S4003ACC | SFG | | X | | |
| ACCOUNTS RCVBLE | 2000ACC | 3002 | | P3002ACC | PFG | LIBACC | X | X | X |
| LARGE OFFICE | 2000ACC | 3002 | 4004 | S4004ACC | SFG | LIBACC | X | X | X |
| SMALL OFFICE | 2000ACC | 3002 | 4005 | S4005ACC | SFG | LIBACC | X | X | X |
| ACCTG FIRM | 2000ACC | 3002 | 4006 | S4006ACC | SFG | LIBACC | X | X | X |
| CHESS | 2000CHS | | | L2000CHS | LCG | LIBGAME | X | X | X |
| CHESS FUNCTION | 2000CHS | 3001 | | P3001CHS | PFG | LIBGAME | X | X | X |
| CHESS LOAD | 2000CHS | 3001 | 4001 | S4001CHS | SFG | LIBGAME | X | X | X |

FIG. 33.

SELECT APPLICATION GROUP FUNCTIONS 24000

| 24010 S | 24050 DESCRIPTION | 24100 LCG ID | 24200 PFG ID | 24300 SFG ID | 24400 RU NAME | 24500 RU TYPE | 24600 LOCATION | 24700 A | 24800 I | 24900 E |
|---|---|---|---|---|---|---|---|---|---|---|
|   | LEGAL OFCE APPLN | 1000AG1 |      |      | L1001AG1 | AG  | LIBGBL  |   |   |   |
| X | OPERATING SYSTEM | 2000SS1 |      |      | L2000SS1 | LCG | LIBSYS  | X | X | X |
| X | BASIC SUPPORT    | 2000SS1 | 3001 |      | P3001SS1 | PFG | LIBSYS  | X | X | X |
| X | HARD DISK        | 2000SS1 | 3001 | 4001 | S4001SS1 | SFG | LIBSYS  | X | X | X |
|   | OPTICAL DISK     | 2000SS1 | 3001 | 4002 | S4002SS1 | SFG | LIBSYS  | X | X | X |
|   | LOCAL AREA NET   | 2000SS1 | 3002 |      | P3002SS1 | PFG | LIBLANS | X | X | X |
|   | PC NETWORK       | 2000SS1 | 3002 | 4003 | S4003SS1 | SFG | LIBLANS | X | X | X |
|   | TOKEN RING       | 2000SS1 | 3002 | 4004 | S4004SS1 | SFG |         | X |   |   |
|   | COMMUNICATIONS   | 2000SS1 | 3003 |      | P3003SS1 | PFG | LIBCAS  | X | X |   |
|   | WINDOWING        | 2000SS1 | 3003 | 4005 | S4005SS1 | SFG |         | X |   |   |
|   | SPLIT SCREEN     | 2000SS1 | 3001 | 4006 | S4006SS1 | SFG | LIBCAS  | X | X |   |
| X | WORD PROCESSING  | 2000WP1 |      |      | L2000WP1 | LCG | LIBUT   | X | X | X |
| X | DOCUMENT PREP    | 2000WP1 | 3001 |      | P3001WP1 | PFG | LIBUTL  | X | X | X |
| X | TABLE OF CONTENT | 2000WP1 | 3001 | 4001 | S4001WP1 | SFG | LIBUTL  | X | X | X |
|   | INDEX            | 2000WP1 | 3001 | 4002 | S4002WP1 | SFG | LIBUTL  | X | X | X |
|   | FANCY PRINTING   | 2000WP1 | 3001 | 4003 | S4003WP1 | SFG | LIBUTL  | X | X | X |
| X | SPELL CHECKER    | 2000WP1 | 3002 |      | P3002WP1 | PFG | LIBUTL  | X | X | X |
| X | GENERAL WORDS    | 2000WP1 | 3002 | 4004 | S4004WP1 | SFG | LIBUTL  | X | X | X |
|   | MEDICAL WORDS    | 2000WP1 | 3002 | 4005 | S4005WP1 | SFG | LIBUTL  | X | X | X |
| X | LEGAL WORDS      | 2000WP1 | 3002 | 4006 | S4006WP1 | SFG | LIBUTL  | X | X | X |
| X | ACCOUNTING       | 2000ACC |      |      | L2000ACC | LCG | LIBACC  | X | X | X |
| X | PAYROLL          | 2000ACC | 3001 |      | P3001ACC | PFG | LIBACC  | X | X | X |
|   | HOSPITAL         | 2000ACC | 3001 | 4001 | S4001ACC | SFG |         | X |   |   |
| X | SMALL OFFICE     | 2000ACC | 3001 | 4002 | S4002ACC | SFG | LIBACC  | X | X | X |
|   | FARM             | 2000ACC | 3001 | 4003 | S4003ACC | SFG |         | X |   |   |
|   | ACCOUNTS RCVBLE  | 2000ACC | 3002 |      | P3002ACC | PFG | LIBACC  | X | X | X |
|   | LARGE OFFICE     | 2000ACC | 3002 | 4004 | S4004ACC | SFG | LIBACC  | X | X | X |
|   | SMALL OFFICE     | 2000ACC | 3002 | 4005 | S4005ACC | SFG | LIBACC  | X | X | X |
|   | ACCTG FIRM       | 2000ACC | 3002 | 4006 | S4006ACC | SFG | LIBACC  | X | X | X |

FIG. 34.

DISPLAY APPLICATION PACKAGE  27000

| 27010S | 27050 DESCRIPTION | 27100 LCG ID | 27200 PFG ID | 27300 SFG ID | 27400 RU NAME | 27500 RU TYPE | 27600 LOCATION | 27700A | 27780I | 27790E |
|---|---|---|---|---|---|---|---|---|---|---|
| | LEGAL OFCE APPLN | 1000AG1 | | | L1001AG1 | AG | LIBGBL | | | |
| X | OPERATING SYSTEM | 2000SS1 | | | L2000SS1 | LCG | LIBSYS | X | X | X |
| X | BASIC SUPPORT | 2000SS1 | 3001 | | P3001SS1 | PFG | LIBSYS | X | X | X |
| X | HARD DISK | 2000SS1 | 3001 | 4001 | S4001SS1 | SFG | LIBSYS | X | X | X |
| X | WORD PROCESSING | 2000WP1 | | | L2000WP1 | LCG | LIBUTL | X | X | X |
| X | DOCUMENT PREP | 2000WP1 | 3001 | | P3001WP1 | PFG | LIBUTL | X | X | X |
| X | TABLE OF CONTENT | 2000WP1 | 3001 | 4001 | S4001WP1 | SFG | LIBUTL | X | X | X |
| X | SPELL CHECKER | 2000WP1 | 3002 | | P3002WP1 | PFG | LIBUTL | X | X | X |
| X | GENERAL WORDS | 2000WP1 | 3002 | 4004 | S4004WP1 | SFG | LIBUTL | X | X | X |
| X | LEGAL WORDS | 2000WP1 | 3002 | 4006 | S4006WP1 | SFG | LIBUTL | X | X | X |
| X | ACCOUNTING | 2000ACC | | | L2000ACC | LCG | LIBACC | X | X | X |
| X | PAYROLL | 2000ACC | 3001 | | P3001ACC | PFG | LIBACC | X | X | X |
| X | SMALL OFFICE | 2000ACC | 3001 | 4002 | S4002ACC | SFG | LIBACC | X | X | X |

SOFTWARE PACKAGING STRUCTURE HAVING HIERARCHICAL REPLACEABLE UNITS

This is a divisional of application Ser. No. 07/122,293 filed on Nov. 18, 1987 now U.S. Pat. No. 9,237,688.

FIELD OF THE INVENTION

This invention relates to the data processing field. More specifically, this invention is a packaging structure for computer software where the software program is made up of several replaceable units configured in a multi-level hierarchical fashion.

BACKGROUND OF THE INVENTION

Data processing has evolved to the point where users expect their computer to manage its own resources with minimal human intervention. Work has been done to manage the hardware portion of a computer system through automatic configuration and problem determination procedures, but little has been done to effectively manage the software portion of a computer system.

A typical user today needs several different programs to perform his specific application. These programs are often made by different program developers. Each program has dependencies on both hardware and software, and it is getting increasingly more difficult for users or application developers to put together a cohesive system where all of these dependencies are met. In addition, one software program may depend on another software program to be at a certain maintenance or release level to operate correctly. Often, the only way a user corrects a dependency problem is through trial and error or through a laborious search through a multitude of reference manuals.

The structure of a software program is often left up to the style and whims of each program developer. It is rare for two software programs today to have a consistent structure so that one program can easily discover information about the other program, such as maintenance levels and dependencies, even if they are developed by the same manufacturer.

Another problem facing program developers and users today is that programs invariably have errors that need to be fixed. Usually, the program developer must send an entirely new program to each user to fix the errors; there is no efficient method of replacing a small section of code in which the problem resided.

The job of an application developer today has become increasingly complex. When the user tells an application developer that he wants an application package tailored to fit his specific needs, the application developer may have problems combining several different programs to match the user's needs, while still allowing for the flexibility of future expansion. Often the application developer must settle for a costly unstructured conglomeration of general purpose programs that either performs functions the user does not need or does not perform all of the functions the user does need. In addition, the conglomeration of general purpose programs inefficiently uses more memory than necessary by storing functions the user does not need. This can be a special hardship to users who have used up all of their memory and cannot store additional, needed programs on their computers.

Program developers would clearly like to have each and every user satisfied with their program. However, it is far too costly today to develop a program customized to meet the needs of all individual user. Program developers would like to develop one program that would meet the needs of all users, from the user who needs all the functions of the program to the user who only needs one function of the program. If this could be done, the program developer could charge each user only for the functions used. As the user's needs grow, additional functions of the same program can be given to the user at an additional charge.

SUMMARY OF THE INVENTION

It is a principle object of the invention to provide for the effective management of software programs in a data processing system.

It is another object of the invention to provide for a packaging structure for computer software where an application package is made up of several replaceable units configured in a multi-level hierarchical fashion.

It is still another object of the invention for the application package to include as an integral part of its hierarchical structure self-identifying information, maintenance levels, and dependencies on hardware and other software.

It is still another object of the invention to provide packaging tools that program developers can use to build a program package and application developers can use to build an application package.

These and other objects are accomplished by the software management structure disclosed herein.

A software application package is made up of several linked replaceable units (RU). Each RU is serviceable without adversely effecting the other RUs. The RUs are arranged in a hierarchical fashion in a series of levels. In the preferred embodiment, five levels are used: Application Group level (AG), Loadable Code Group level (LCG), Primary Functional Group level (PFG), Secondary Functional Group level (SFG), and Operational Code Group level (OCG). The AG level defines a group of computer programs combined to perform a high level application tailored to meet the needs of the user. The LCG level defines individual programs each created to perform a general task. The PFG level refines the common programs defined in the LCG level to a more specific set of primary functions. The SFG level refines the primary functions defined in the PFG level to an even more specialized set of secondary functions tailored closely to fit a specific user's needs. The OCG level contains the operational code needed to run the specialized user application package defined by the preceding four levels.

An AG RU links to one or more LCG RUs, which each link to one or more PFG RUs, which each link to one or more SFG RUs, which each link to one or more OCG RUs. In this manner, a five level hierarchical structure is defined.

Each RU is made up of a header portion and a body portion. The header of each RU, regardless of level, contains self-identifying and maintenance information, and can also contain a list of hardware and software dependencies unique to that RU. The body of the AG, LCG, PFG, and SFG RUs contains additional self-identifying and maintenance information, in addition to a list of RUs in the next level that form a part of the hierarchical chain. The self identifying, maintenance and dependency information contained in the RUs is also known as vital product data, or VPD. The body of each RU on the OCG level contains the operational code used to run the program.

The hierarchical structure of the software application, the replaceable nature of the RUs, and the self-identifying, maintenance and dependencies information contained in the RUs allows for software to become highly sophisticated. This structured software can then be used to solve a multitude of problems with data processing today, many of which have been discussed above.

Program developers use the program packaging tools of the invention to create programs packaged in four levels: LCG, PFG, SFG, and OCG. An application developer uses the application packaging tools of the invention to combine several of these program packages together to create an application package. This is done by adding the AG level on top of the four levels of the selected program packages. In addition, the application developer can select certain primary and secondary functions of the selected program packages while omitting other primary and secondary functions of the selected program packages. The packaging structure and packaging tools of the subject invention gives the application developer the power and flexibility to create an application package tailored to meet the needs of a specific user.

The loadable code hierarchial structures also provide an additional benefit in that the different loadable code types such as microcode, marketed programs and user developed applications can be managed using a common set of management tools as opposed to a set of tools customized for each loadable code type. This capability exists because the packaging structures for each code type are similar.

BRIEF DESCRIPTION OF THE DRAWING

FIG. 7 shows the Fixed Header portion common to all RUs in more detail.

FIG. 8 shows the Variable Header portion common to all RUs in more detail.

FIG. 9 shows the Fixed AG Information block of an AG RU in more detail.

FIG. 10 shows the Variable AG Information block of an AG RU in more detail.

FIG. 11 shows the Fixed LCG Information block of an LCG RU in more detail.

FIG. 12 shows the Variable LCG Information block of an LCG RU in more detail.

FIG. 13 shows the Fixed PFG Information block of an PFG RU in more detail.

FIG. 14 shows the Variable PFG Information block of an PFG RU in more detail.

FIG. 15 shows the Fixed SFG Information block of an SFG RU in more detail.

FIG. 16 shows the Variable SFG Information block of an SFG RU in more detail.

FIG. 17 shows a menu of the Program Packaging Tools available to a program developer.

FIGS. 18–24, 25A, 25B, 25C and 26–30 show the Define Program Package Tool and the Define Application Package Tools in more detail.

FIG. 31 shows an example of Program Packages displayed using the Display Program Package Tool.

FIG. 32 shows a menu of the Application Packaging Tools available to an application developer.

FIG. 33 shows an example of how an application developer could use the Select Application Group Functions Tool.

FIG. 34 shows an example of an Application Package displayed using the Display Application Package Tool.

DETAILED DESCRIPTION OF THE PREFERRED EMBODIMENT

Figure 1:
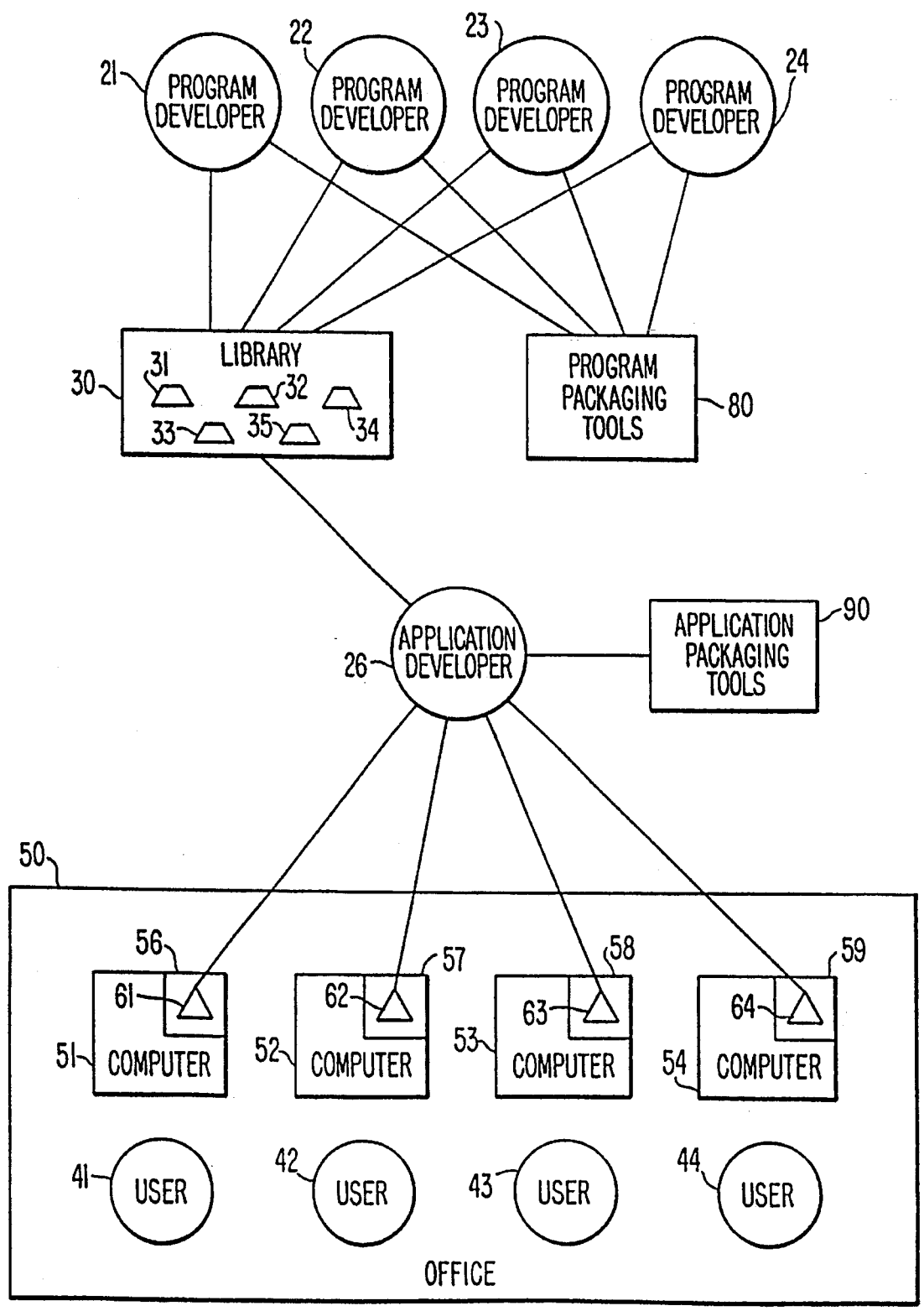
FIG. 1 shows the environment of the invention.

FIG. 1 shows the environment of the invention. Program developers 21–24 each develop programs packaged according to the packaging structure of the invention, as will be explained in more detail later. Program developers 21–24 usually work independently of each other and often compete with each other. Although only four program developers are shown in FIG. 1, several thousand people develop programs worldwide and are program developers if they follow the packaging structure of the invention.

The programs developed by program developers 21–24 are placed in library 30. Library 30 represents a collection of all the programs developed by the program developers. For example, library 30 can contain operating system programs, word processing programs, spreadsheet programs, game programs, educational programs, communications programs, and publishing programs, just to name a few. Each program performs primary functions and secondary functions, as will be explained later. Programs 31–35 are shown in library 30 and are shown in more detail in FIG. 2.

Application developer 26 takes the programs located in library 30 and repackages them to create a application package tailor fit to meet a particular user's needs. Programs the user needs are combined under one application package and that application package is given to the user. Only the general and specific functions of the programs the user needs are selected to be included in the application package the user receives.

In FIG. 1, application developer 26 is assigned the task of creating an application package for users 41–44 working in office 50. Office 50 has four computers 51–54 used by users 41–44. Computers 51–54 contain storage areas 56–59, respectively. Storage areas 56–59 contains application packages 61–64, respectively. Although only one application package is shown in each storage area, several could be stored. Application packages 61–64 were created by application developer 26 out of programs contained in library 30 written by program developers 21–24. Application packages 61–64 are tailor fit to meet the needs of users 41–44, respectively.

Program developers 21–24 use packaging tools 80 to package their programs according to the packaging structure of the invention. Likewise, application developer 26 uses packaging tools 90 to repackage the programs created by programming developers 21–24 into an application package tailor fit to the needs of a specific user. Packaging tools 80 and 90 are quite similar and will be described in more detail in FIGS. 17–34.

Figure 2A:
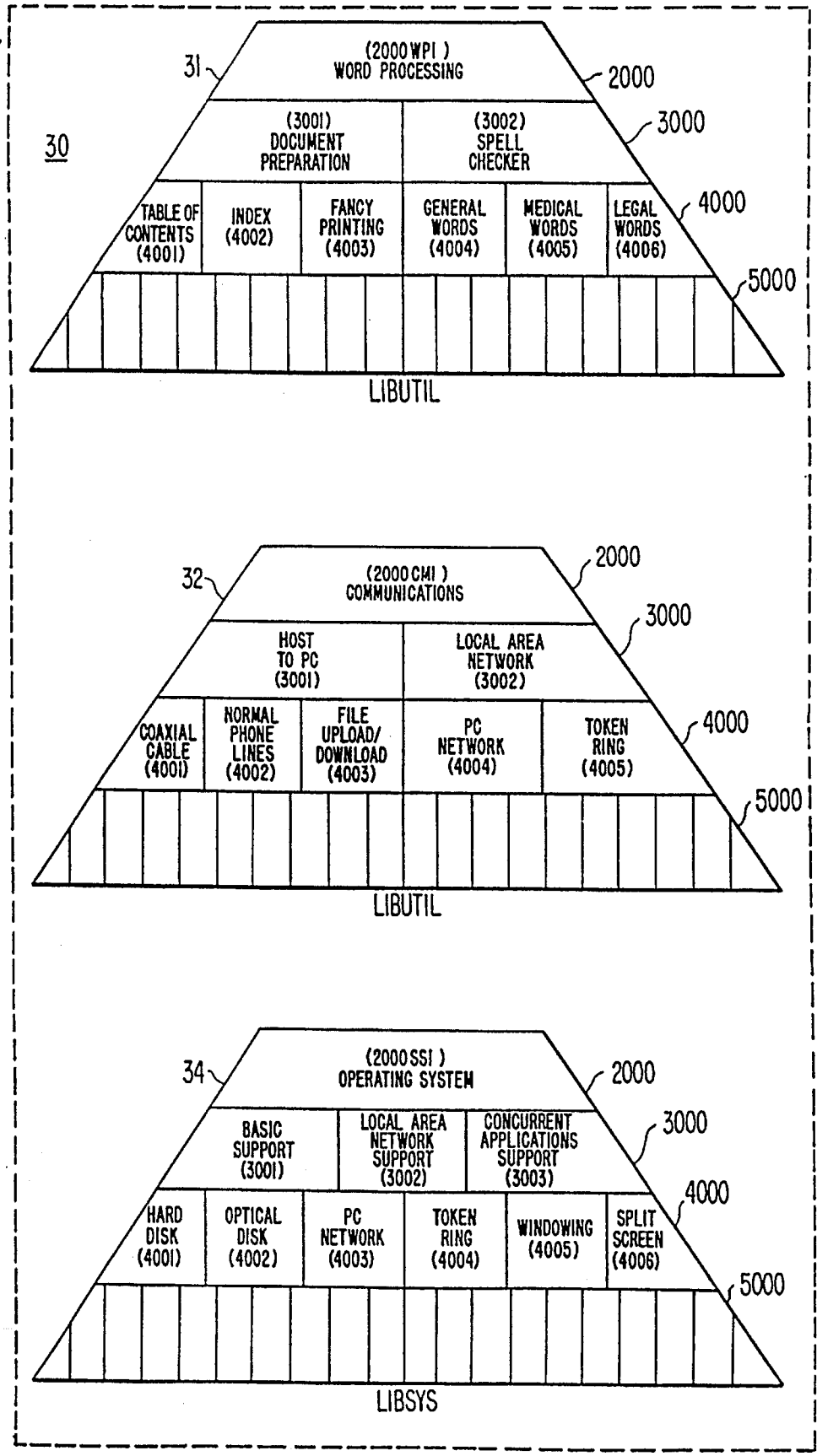
FIG. 2 shows programs packaged according to the invention contained in a software library.

FIG. 2 shows programs 31–35 in more detail contained in library 30. Note that programs 31–35 are shown pictorially like a pyramid without a top. This symbolizes that these programs have been written according to a packaging structure, but are not yet part of an application package.

Program 31 is a word processing program. This particular word processing program has two primary functions: document preparation and spell checking. The document preparation primary function has three secondary functions: table of contents capabilities, index generation capabilities, and fancy printing capabilities. The spell checking primary function has three secondary functions: general words, legal words, and medical words. Each secondary function has corresponding operational code on level 5000 used to perform that particular function.

Programs 32–35 are a communications program, an accounting program, a operating system, and a chess program. Note that each of these programs except chess program 35 has multiple primary functions and secondary functions. Chess program 35 is so simple it only has a single primary and secondary function.

Programs 31–35 are merely illustrative of programs that could be created by program developers using packaging tools 80. Program developers are given wide flexibility to choose whatever they want as primary and secondary functions. The more primary and secondary functions they choose, the more versatile the program will be, and the more likely an application developer will be able to include that program in an application package tailor fit to meet a specific user's needs.

Referring now to FIGS. 1 and 2, assume office 50 is a small legal office. Application developer 26, after talking to user 41, has concluded that user 41 needs word processing program 31, accounting program 33, and operating system 34, but not communications program 32, or chess program 35. Application developer 26 has also concluded that user 41 needs the document preparation and spell checker primary functions of word processing program 31, and needs the table of contents generation, general words and legal words secondary functions, but does not need any of the other secondary functions. Likewise, some of the primary and secondary functions of accounting program 33 and operating system 34 have been selected, and some have been omitted based on the needs of user 41. Application developer 26 repackages programs 31, 33, and 34 into application package 61 and gives it to user 41, who stores it in memory 56 of his computer 51. Application packages 62–64 are created in a similar manner based on the needs of users 42–44. Application developer 26 uses packaging tools 90 to create application package 61–64, as will be discussed later.

Figure 3:
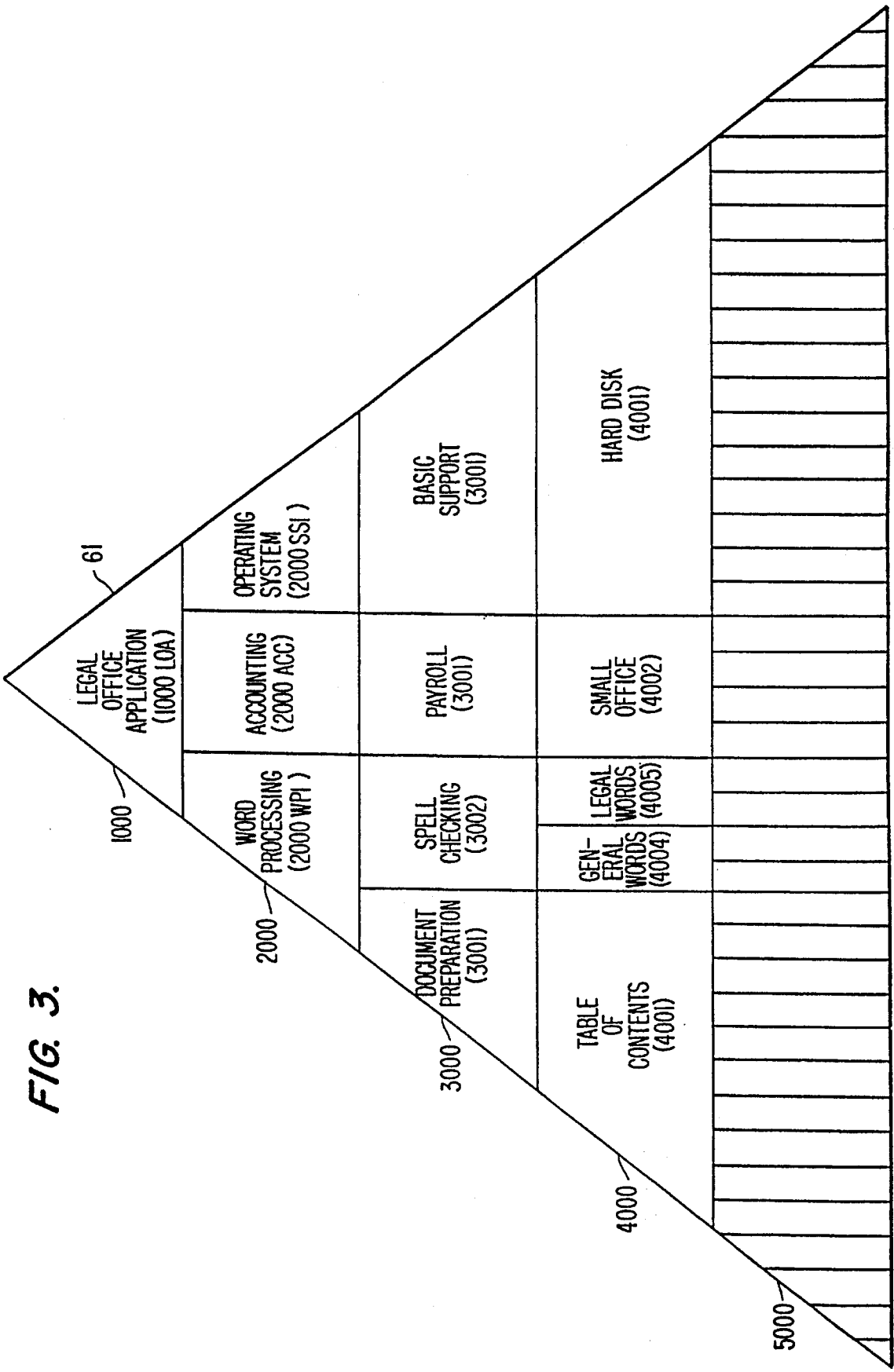
FIG. 3 shows an application package tailored to meet the needs of a specific user.

FIG. 3 shows application package 61 created by application developer 26 for user 41. Note that application package 61 is shown pictorially as a pyramid, now complete with a top. Application package 61 only contains the programs, primary functions, and secondary functions user 41 needed. If the needs of user 41 change, a new application package can be created for him.

Note that application package 61 is made up of five levels: 1000, 2000, 3000, 4000, and 5000. The five level packaging structure of the preferred embodiment is shown in more detail in FIGS. 4–17.

Figure 4:
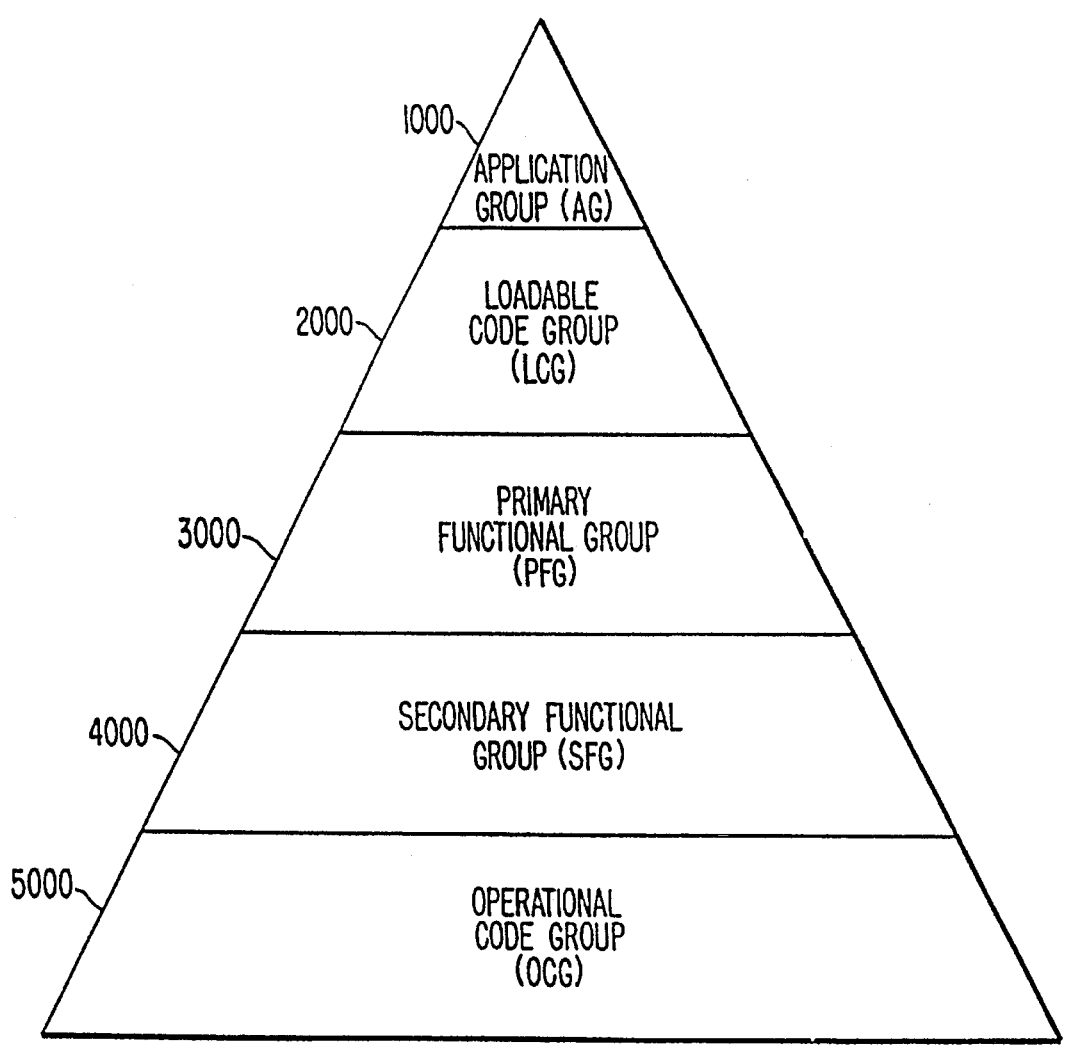
FIG. 4 shows a representation of the levels of a software application package arranged in hierarchical fashion.

FIG. 4 shows the software management structure of the preferred embodiment. Note that five levels are shown and that the structure is shown in the shape of a pyramid to emphasize its hierarchical nature. The topmost level, Application Group (AG) level 1000, defines a group of computer programs combined to form a high level user application. For example, application package 61 of FIG. 3 defines a group of programs for a legal office in its AG level. The second level, Loadable Code Group level (LCG) 2000, defines individual programs that each perform a general task. For example, application package 61 of FIG. 3 has a word processing program, an accounting program and an operating system on Loadable Code Group level 2000. The third level, Primary Functional Group level (PFG) 3000, refines the common programs defined in the LCG level to a more specific set of primary functions. For example, for the word processing program on the LCG level of application package 61 of FIG. 3, the PFG level contains the primary functions of document preparation and spell checking. The same type of refinement can occur for the other programs on the LCG level.

The fourth level, Secondary Functional Group level (SFG) 4000, refines the secondary functions defined in the PFG level to an even more specialized set of secondary functions tailoring more closely to fit a specific user's needs. The SFG level identifies the minimum number of RUs a given operable function that can be loaded onto a computer system. For example, for the spell checking primary function on the PFG level of application package 61 of FIG. 3, the SFG level contains the secondary functions of general words and legal words. The same type of refinement can be done for the other primary functions on the PFG level.

The last level, Operational Code Group level (OCG) 5000, contains the operational code needed to run the specialized user application defined by the previous four levels.

Figure 5:
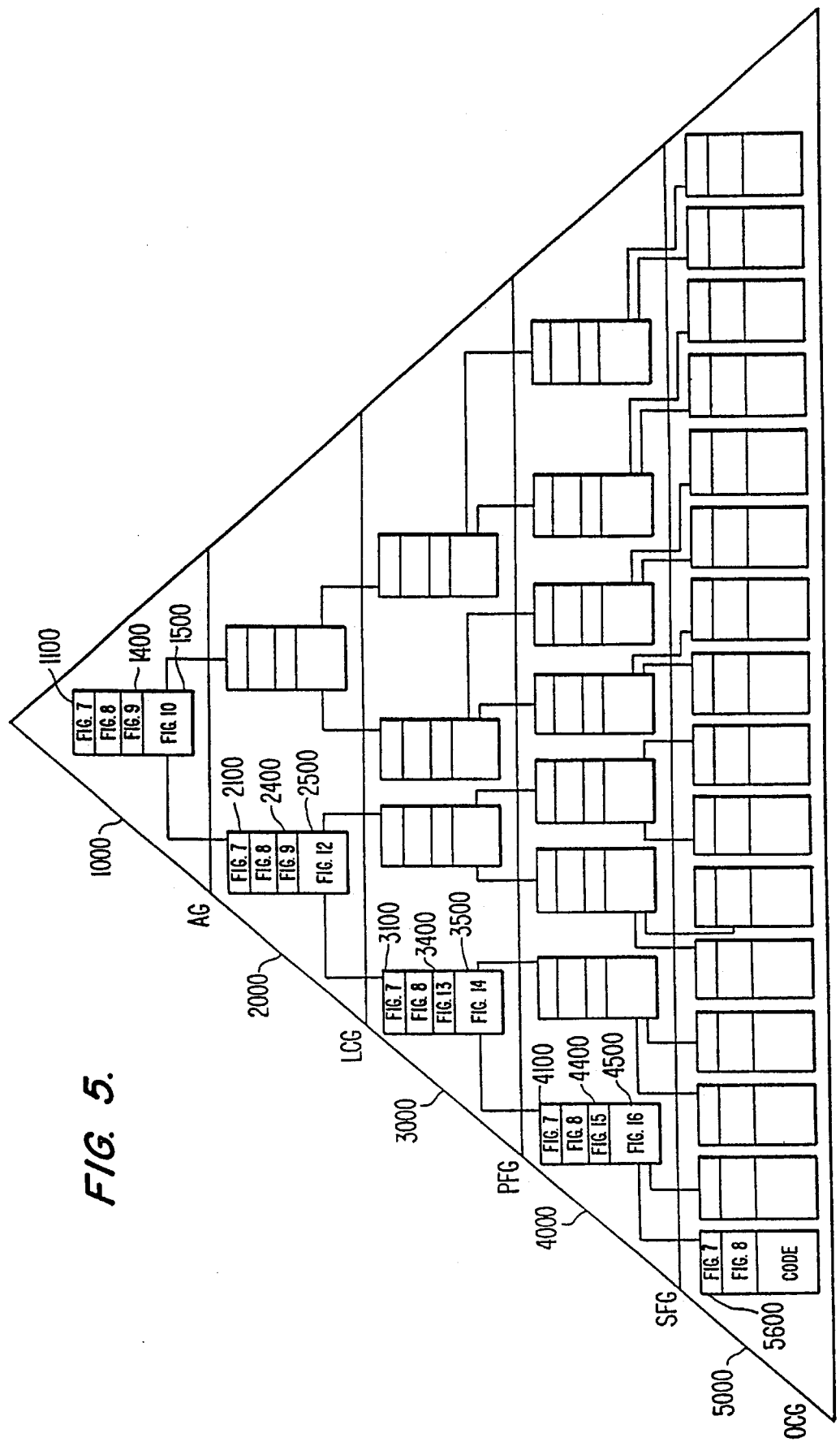
FIG. 5 shows the hierarchical levels of FIG. 1 in more detail to show individual Replaceable Units.

FIG. 5 illustrates the hierarchical structure of the preferred embodiment of FIG. 4 in more detail. Note that AG level 1000 is made up of replaceable unit (RU) 1100. The contents of RU 1100 will be described in more detail in FIGS. 6A, 7–10. RU 1100 is connected to at least one RU on LCG level 2000. FIG. 5 shows RU 1100 connected to RU 2100 on LCG level 2000. The contents of RU 2100 will be described in more detail in FIGS. 6A, 7, 8, 11, and 12. RU 2100 is connected to at least one RU on PFG level 3000. FIG. 5 shows RU 2100 connected to RU 3100 on PFG level 3000. The contents of RU 3100 will be described in more detail in FIGS. 6A, 7, 8, 13 and 14. RU 3100 is connected to at least one RU on SFG level 4000. FIG. 5 shows RU 3100 connected to RU 4100. The contents of RU 4100 will be described in more detail in FIGS. 6A, 7, 8, 15° and 16. RU 4100 is connected to at least one RU on OCG level 5000. FIG. 5 shows RU 4100 connected to RU 5600. The contents of RU 5600 will be described in more detail in FIGS. 6B, 7 and 8.

Figure 6A:
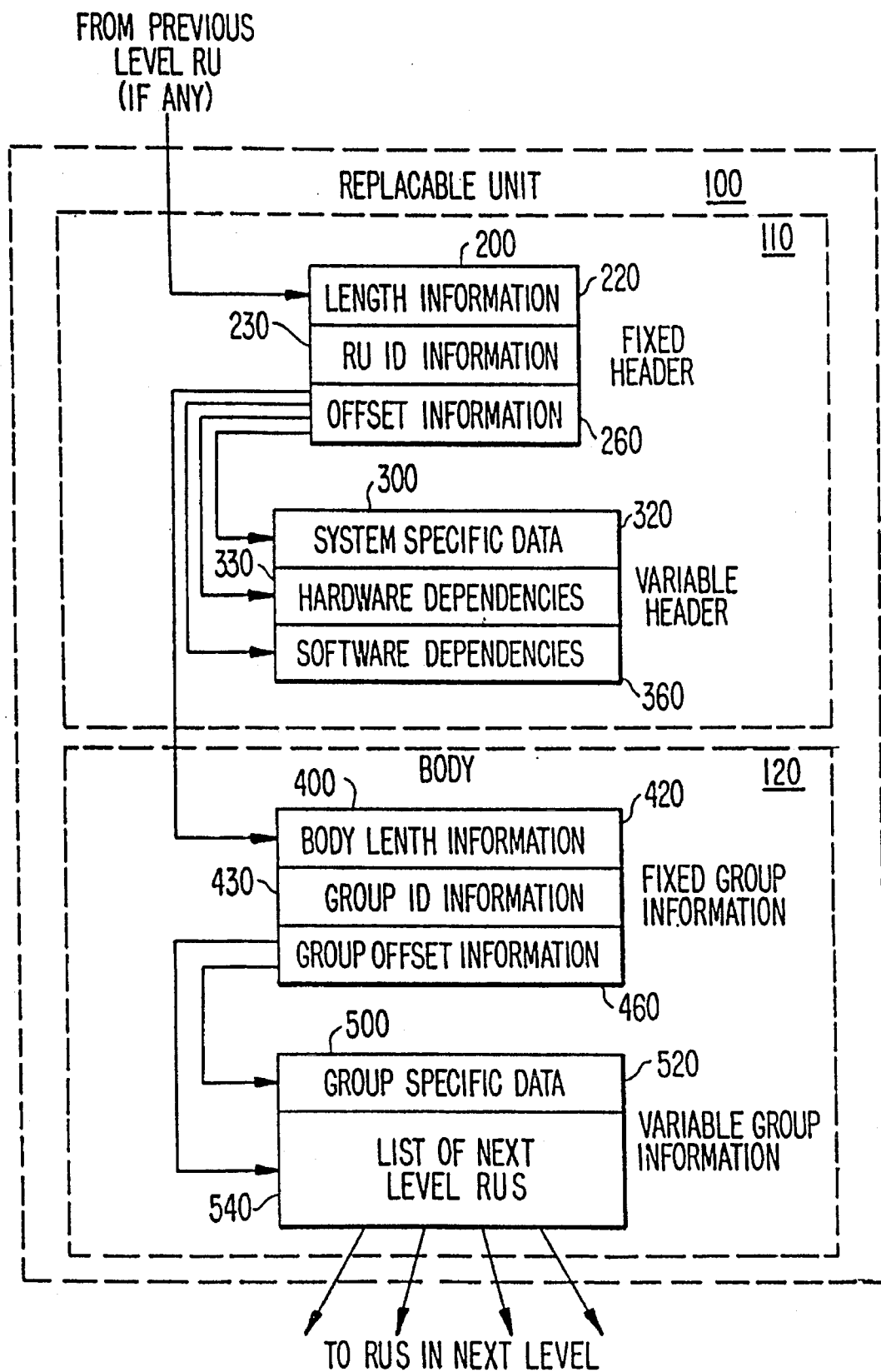
FIG. 6A shows the Replaceable Unit in more detail used to make up the AG, LCG, PFG, and SFG levels.

FIG. 6A shows the replaceable unit in more detail used to make up the AG, LCG, PFG, and SFG levels. Replaceable unit 100 is made up of header 110 and body 120. Header 110 is made up of a fixed header block 200 and a variable header block 300. Body 120 is made up of a fixed group information block 400 and a variable group information block 500. Fixed header block 200 is made up of length information portion 220, RU ID information portion 230 and offset information portion 260. Length information portion 220 keeps track of the total length of RU 100 and the length of body 120 of RU 100. RU ID information portion 230 contains self-identifying information that uniquely identifies this particular replaceable unit from all other replaceable units of FIG. 5. In addition, RU ID information portion 230 contains maintenance information that can be used to determine the maintenance level of this particular RU.

Offset information portion 260 contains offsets to data in variable header portion 300 and fixed group information portion 400. Specifically, offset information portion 260 has offsets into system specific data portion 320, hardware dependencies portion 330, and software dependencies portion 360 in variable header 300. Offset information 260 also has an offset into fixed group information block 400. The specific fields contained in fixed header block 200 is described in more detail in FIG. 7, and variable header block 300 is described in more detail in FIG. 8.

Referring again to FIG. 6A, body 120 is made up of fixed group information block 400 and variable group information block 500. Fixed group information block 400 contains body length information portion 420, group ID information portion 430 and group offset information portion 460. Body length information portion 420 keeps track of the total length of body 120. Group ID information portion 430 contains additional self-identifying information and maintenance information. Group offset information portion 460 has offsets into variable group information block 500. Specifically, group offset information portion 460 has offsets to data in group specific data portion 520 and to the list of the next level entries portion 540.

The specific fields contained in fixed group information block 400 and variable group information block 500 depends on if RU 100 is in AG level 1000, LCG level 2000, PFG level 3000, or SFG level 4000. If replaceable unit 100 resides in AG level 1000, fixed AG information block 1400 is shown in more detail in FIG. 9 and variable AG information block 1500 is shown in more detail in FIG. 10. If replaceable unit 100 resides in LCG level 2000, fixed LCG information block 2400 is shown in FIG. 11 and variable LCG information block 2500 is shown in FIG. 12. Likewise, if replaceable unit 100 resides in PFG level 3000, fixed PFG information block 3400 is shown in FIG. 13 and variable PFG information block 3500 is shown in FIG. 14. Finally, if replaceable unit 100 resides in SFG block 4000, fixed SFG information block 4400 is shown in FIG. 15 and variable SFG information block 4500 is shown in FIG. 16.

Figure 6B:
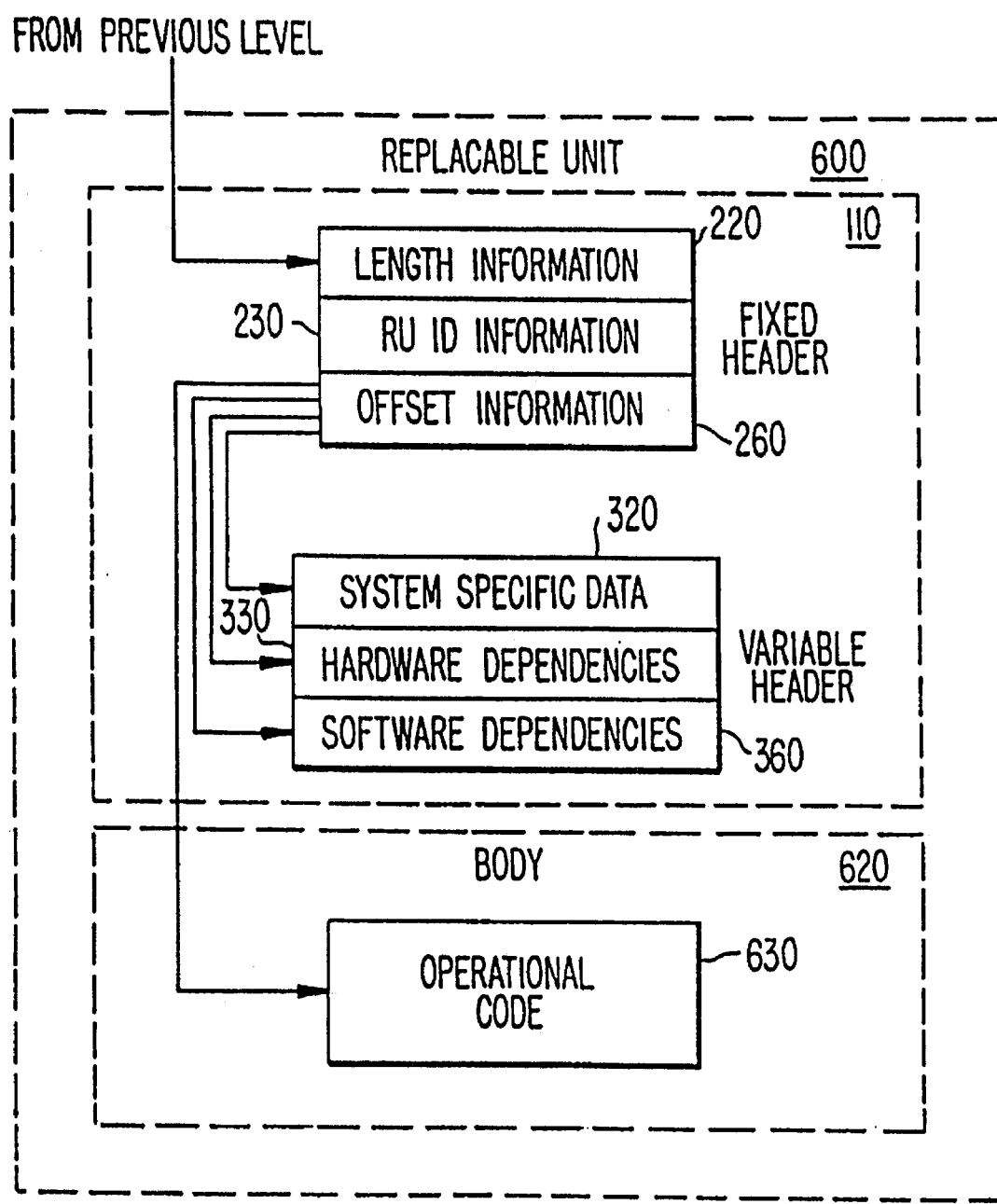
FIG. 6B shows the Replaceable Unit in more detail used to make up the OCG level.

Replaceable unit 600 of FIG. 6B will now be discussed. Replaceable unit 600 only resides in OCG level 5000. Note that replaceable unit 600 has a header portion 110 identical to header portion 110 of replaceable unit 100 shown in FIG. 6A. Replaceable unit 600 also has body portion 620 which is different than body 120 of replaceable unit 100. Specifically, body 620 contains operational code 630. Operational code 630 is non-architected and is the data or executable code of the program. Operational code 630 optionally contains additional vital product data (self-identifying, maintenance, and dependencies information).

As previously discussed in connection with FIG. 6A, header 110 of replaceable unit 100 contains the same fields regardless of the level replaceable unit 100 is located. FIG. 7 shows fixed header block 200 in more detail. Length information portion 220 consists of two fields. Field 221 identifies the total length of this particular RU. Field 222 identifies the total length of the body of this RU. This information is used to allow RUs to be chained together. ID information portion 230 contains several fields of self-identifying information and several fields of maintenance information. RU name field 231 is used by the system in managing a RU. The name given to a particular RU should be unique so that it can be distinguished from all the other RUs in the system. Column 17400 of FIG. 31 shows examples of RU names. RU reference ID field 232 provides additional visual identification of an RU. RU load identification field 233 identifies the RU as a special load required by a piece of equipment that has a corresponding initial program load ID. This provides a mechanism for the system to determine RUs which must be loaded during the initial program load process. Note that RU load ID field 233 is optional. LCG and AG ID field 234, PFG ID field 236 and SFG ID field 237 contain the IDs of other RUs in the hierarchical chain.

The maintenance information fields in ID information portion 230 of fixed header 200 will now be discussed. RU instruction set field 241 identifies the machine instruction sets for which data in the RU body is compatible. This field is optional. RU control information field 242 contains several flags which are used to manage the RU. One flag is a RU modification flag which is set if the RU has been modified. A second flag is an RU dependency flag which is set if this particular RU has any hardware or software dependencies. A third flag is an RU type flag which specifies if this RU is an AG, PFG, SFG or OCG RU.

RU development information field 243 contains information concerning the initial development of this RU such as the particular laboratory that developed this RU. RU create date field 244 and RU create time field 246 contains data and time stamps when this RU was created. RU install date field 247 and RU install time field 248 contains date and time stamps of when the RU was installed on the system. RU version level field 249 and RU release modification level 250 identifies the maintenance level of this particular RU. RU temporary fix ID field 252 and RU patch ID field 253 are optional and gives names for any temporary fixes or patches made to this RU. RU common name field 254 is a binary alias for RU name field 231 and can optionally be used by the system software. Fields 257 and 258 identify information about the RU's compiler.

The fields that make up offset information portion 260 of fixed header block 200 will now be discussed. Offset to RU body field 261 points to the beginning of the body of this RU. Offset to RU system specific data field 262 points to the beginning of any system specific data contained in the variable header block of the RU. Offset to RU hardware dependency list field 263 points to the beginning of a hardware dependency list contained in the variable header block of the RU. Offset to RU software dependency list field 264 points to the beginning of a software dependency list contained in the variable header block of the RU. Field 265 points to the beginning of RU specific information. Field 267 points to embedded VPD in an OCG body, if present.

Name of system area which contains RU field 266 contains the name of the location in system memory where the RU resides. Examples of location names are shown in column 17600 of FIG. 31. Fields 270 and 271 contain the date and time the RU was last modified. Field 272 points to header extension data contained in the variable header.

FIG. 8 shows the fields of variable header block 300 in more detail. System specific data portion 320 is made up of length of system specific data field 321 and system specific data field 322.

The fields contained in hardware dependency list portion 330 of variable header block 300 will now be described. Field 331 contains the number of entries in the hardware dependency list. Fields 332–337 and 339 make up one entry in the hardware dependency list and are repeated for multiple entries in the list. Field 332 contains an RU hardware correlation ID. Several different pieces of hardware may be given the same correlation ID if they should always be used together. Fields 333, 335, 336, and 337 contain the type, model number, level ID number and part number of the specific piece of hardware on which this RU is dependent.

The fields contained in software dependency list portion 360 of variable header block 300 will now be described.

Field 361 contains the size of the software dependency list and field 362 contains the number of entries in the software dependency list. Fields 363–376 make up an entry in the software dependency list. These fields are repeated for each entry in the list. Field 363 contains the size of this particular entry in the software dependency list. Field 364 contains the software correlation ID for this entry in the software dependency list. Several different pieces of software may be given the same correlation ID if they should always be used together.

It is presumed that the software program contained in the software dependency list is structured as disclosed in this invention. Therefore, the hierarchical chain of RUs that make up the software program on which this RU depends must be shown. LCG ID field 367, LCG-PFG ID field 370 and PFG-SFG ID field 373 provides information defining this hierarchical chain. Fields 368 and 369 show the version level and release/modification level of the LCG of the software program dependent upon. Likewise, the version level and release/modification level of the LCG-PFG chain is shown in fields 371 and 372 and the version level, release/modification level, and interim PC level of the PFG-SFG chain as shown in fields 374 through 376. Fields 381–384 make up the header extension. Field 382 contains the part number of the RU. Field 383 contains a short description of the RU. Examples of short descriptions of RUs are shown in column 17050 of FIG. 31.

Detailed description of the fields of body 120 of replaceable unit 100 as shown in FIG. 6A will now be discussed. Body 120 contains fixed group information block 400 and variable group information block 500, as previously discussed. Blocks 400 and 500 contain different fields depending upon which level the RU is located in the hierarchical chain. Fixed AG information block 1400 is found in replaceable unit 1100 on AG level 1000 and is described in more detail in FIG. 9.

Length information portion 1420 contains a field that keeps track of the total length of the AG body. Fields that make up Group ID information portion 1430 of fixed AG information block 1400 of RU 1100 will now be discussed. Fields 1431–1439 identifies the name of the vendor who built this particular AG RU. The vendor is usually the application developer who constructed the application package. Field 1441 is a character constant which provides visual identification that this RU is an AG type RU. Fields 1443–1446 describe the identification, part number, version level, and release/modification level for this AG RU. Fields 1447 and 1448 contain information about any interim or temporary (between level) changes made to this AG RU. Field 1449 contains copyright information from the owner of the RU.

Fields that make up offset information portion 1460 of fixed AG information block 1400 of RU 1100 will now be discussed. Field 1463 points to a list of LCG RUs connected to this AG RU in the hierarchical chain. This list is contained in variable AG information block 1500 shown in more detail in FIG. 10. Field 1464 points to the beginning of AG specific data contained in variable AG information block 1500 shown in more detail in FIG. 10.

The fields that make up variable AG RU information block 1500 of FIG. 10 will now be discussed. AG specific data portion 1520 is made up of field 1521 which contains the length of the AG specific data and field 1522 which contains the AG specific data.

The fields that make up LCG list 1540 will now be discussed. Field 1541 defines the size of the LCG list and field 1543 defines the number of entries in the LCG list. Fields 1545–1556 make up one entry in the LCG list and are repeated for each entry in the LCG list. Field 1545 is the select/omit flag which, if enabled, identifies this LCG as being selected for the AG. Field 1546 indicates if this LCG is available for use by the AG. Field 1547 indicates whether the available LCG has been installed on the system. Field 1548 indicates whether the installed LCG has been enabled to run on this system. Fields 1546–1548 allow LCGs to be included as part of an application package sent to a user but not enabled for that user's use until needed by the user for expansion or upgrade purposes. For example, an accounts payable LCG can be given to the user but not enabled until the user upgrades his application and needs this additional function. These fields can also be used as part of a copy protection scheme for the software.

Field 1550 contains the location in system where this particular LCG resides. Examples of system location names are shown in column 17600 of FIG. 31. Field 1552 contains the name of the LCG used by the system to uniquely identify this particular LCG. Examples of RU names are shown in column 17400 of FIG. 31. Field 1554 contains an identification of the LCG. Examples of LCG IDs are shown in column 17100 of FIG. 31. Fields 1555 and 1556 contain the version level and the release/modification level of the LCG entry.

FIG. 11 describes the fields that make up in the fixed LCG information block 2400 of RU 2100 located on LCG level 2000 (FIG. 5). Note that many of these fields are similar to the fields in fixed AG information block 1400 shown in FIG. 9. Refer to the discussion of FIG. 9 for a description of these fields. The vendor information contained in fields 2431–2439 usually refers to the program developer that created the program package. Field 2463 points to the list of PFG RUs linked to this LCG RU. This list is contained in variable LCG information block 2500 as shown in FIG. 12. Field 2464 points to LCG specific information also contained in variable LCG information block 2500 of FIG. 12. Field 2465 points to AG data also contained in variable LCG information block 2500 of FIG. 12. Field 2467 points to exit programs located in block 2500.

Variable LCG information block 2500 of RU 2100 is shown in FIG. 12. Note that many of the fields in variable LCG information block 2500 of FIG. 12 are similar to the fields in variable AG information block 1500 of FIG. 10. Refer to the discussion of FIG. 10 for a description of these fields. The AG data referred to in field 2465 of FIG. 11 is shown in fields 2531–2533 of FIG. 12. Information contained in these fields allows the LCG to identify the AG to which it is attached. The name and location of the exit programs are shown in fields 2561–2569. These programs are called in the event of an error while creating application packages or program packages.

FIG. 13 shows fixed PFG information block 3400 of RU 3100 on PFG level 3000 (FIG. 5). Note again that several of the fields of fixed PFG information block 3400 of FIG. 13 are similar to the fields in fixed AG information block 1400 of FIG. 9. Refer to the discussion of FIG. 9 for a description of these fields. Notice, however, that vendor information contained in blocks 1400 and 2400 are no longer included in block 3400. Field 3434 identifies the LCG ID for this PFG RU in the hierarchical chain. Field 3463 points to the list of SFG RUs linked to this PFG RU. This list is contained in the variable PFG information block 3500 as shown in FIG. 14. Field 3464 points to PFG specific information also contained in variable PFG information block 3500 of FIG. 14. Fields 3461 and 3462 point to hardware and software dependency data contained in variable PFG information block 3500, if present.

FIG. 14 shows variable PFG information block 3500 of RU 3100 on level 3000 (FIG. 5). Note that several of the fields of block 3500 of FIG. 14 are similar to fields in block 1500 of FIG. 10. Refer to the discussion of FIG. 10 for a description of these fields.

Fixed SFG information block 4400 (FIG. 5) of RU 4100 located on SFG level 4000 is shown in FIG. 15. Note that many of the fields of fixed SFG information block 4400 are similar to fixed AG information block 1400 of FIG. 9. Refer to the discussion of FIG. 9 for a description of these fields. Fields 4433 and 4434 identify the RUs for this SFG RU in the higher levels in the hierarchical chain.

Field 4461 points to a list of OCG RUs linked to this SFG RU. This list is contained in variable SFG information block 4500 as shown in FIG. 16. Field 4462 points to temporary fix/patch activity contained in variable SFG information block 4500. Field 4463 points to SFG specific information also contained in variable SFG information block 4500.

The variable SFG information block 4500 of RU 4100 is shown in FIG. 16. Note that several of the fields of block (FIG. 5) 4500 are similar to fields in block 1500 of FIG. 10. Refer to the discussion of FIG. 10 for a description of these fields. Fields 4561–4570 define a list of temporary fix/patch activity connected with this RU.

Referring again to FIG. 1, the program packaging tools 80 used by program developers 21–24 to build program packages will now be discussed. Program packaging tools 80 are software which runs on a general purpose computer, such as a personal computer, suitably programmed as shown in FIGS. 17–34. FIG. 17 shows a menu of the tools a program developer can use to create a program package. The program developers use the program packaging tools as shown in FIG. 17 to create programs packaged in four levels: LCG, PFG, SFG and OCG. Program packaging tool 11000 allows the program developer to define the program package. Packaging tool 11000 is shown in more detail in FIGS. 18–30. Packaging tool 17000 allows the program developer to display the program packages defined by packaging tool 11000. An example of program packages displayed for the program developer is shown in FIG. 31.

Figure 19:
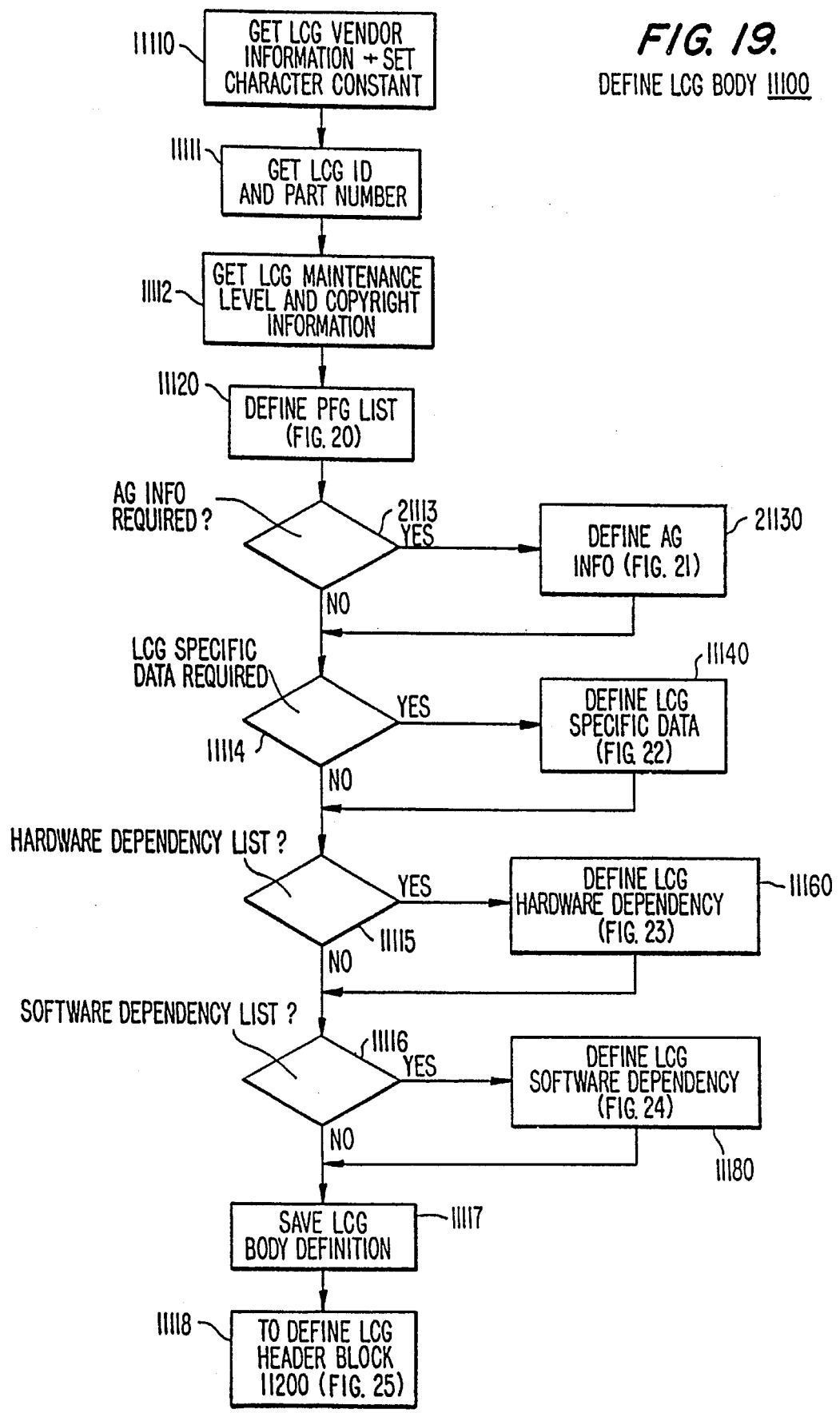

FIG. 18 shows the overall flow of control of packaging tool 11000. Note that FIG. 18 also shows the overall flow of control of define application package tool 21000, due to the similarity between these two tools. Sections of the flowcharts of FIGS. 18–30 unique to application package tool 21000 are given reference numerals 21000–21999. These sections will be discussed later in conjunction with the discussion of define application package tool 21000. Decision block 11010 asks the program developer if he wants to define an LCG. If the program developer indicates he does want to define an LCG, the LCG body is defined in block 11100. The details of block 11100 are shown in FIG. 19. The LCG header is then defined in block 11200. The details of block 11200 are shown in FIG. 25. Decision block 11020 asks the program developer whether he wants to define a PFG. If so, a PFG body is defined in block 11400. Details of block 11400 are shown in. FIG. 26. The PFG header is then defined in block 11200. Details of block 11200 are shown in FIG. 25. Note that block 11200 is common to defining the headers for LCG, PFG, SFG, AG and OCG levels.

Decision block 11030 asks the program developer whether he wants to define an SFG. If so, the SFG body is defined in block 11500. Details of block 11500 are shown in more detail in FIG. 27. The SFG header is then defined in block 11200, as previously discussed. Decision block 11050 asks the program developer whether he wants to define an OCG. If so, block 11060 links to the OCG body, which contains the operational code or data of the program. Block 11200 defines the OCG header as previously discussed. Block 11070 asks the program developer if he is done using tool 11000. Note that if a program developer were designing a program package from scratch, he would define the OCG's first, then the SFGs, then the PFGs, then the LCGs.

FIG. 19 shows how block 11100 of FIG. 18 defines the LCG body. Block 11110 prompts the program developer for the vendor information contained in fields 2431–2439 as shown in FIG. 11. Typically, the vendor asked for in these fields is the program developer himself or the company for which he works, although a different vendor could be specified here. Block 11110 asks the program developer to set the character constant for the LCG. This data is contained in field 2440 of FIG. 11. Block 11111 asks the program developer for the LCG ID and part number. This information is placed in fields 2450 and 2451 of FIG. 11. Block 11112 asks the program developer for LCG maintenance level information and copyright information. This information is placed in fields 2452–2456 of FIG. 11. Block 11120 defines the PFG list associated with this LCG. Block 11120 is shown in more detail in FIG. 20 and will be described later. Blocks 21113 and 21130 are used by application developers and will be discussed later.

Decision block 11114 asks the program developer whether LCG specific data is required. If so, LCG specific data is defined in block 11140. Block 11140 is shown in more detail in FIG. 22 and will be described later. Block 11115 asks the program developer if there is any hardware upon which this LCG is dependent. If so, an LCG hardware dependency list is defined in block 11160. Block 11160 is shown in more detail in FIG. 23 and will be discussed later.

Decision block 11116 asks the program developer whether there is any software upon which this LCG is dependent. If so, an LCG software dependency list is defined in block 11180. Block 11180 is shown in more detail in FIG. 24 and will be discussed later. Block 11117 saves the definitions of the LCG body defined by the program developer in FIG. 19. Block 11118 advances the flow of control to block 11200, where the LCG header is defined. Block 11200 will be described in more detail later in conjunction with FIG. 25.

Figure 20:
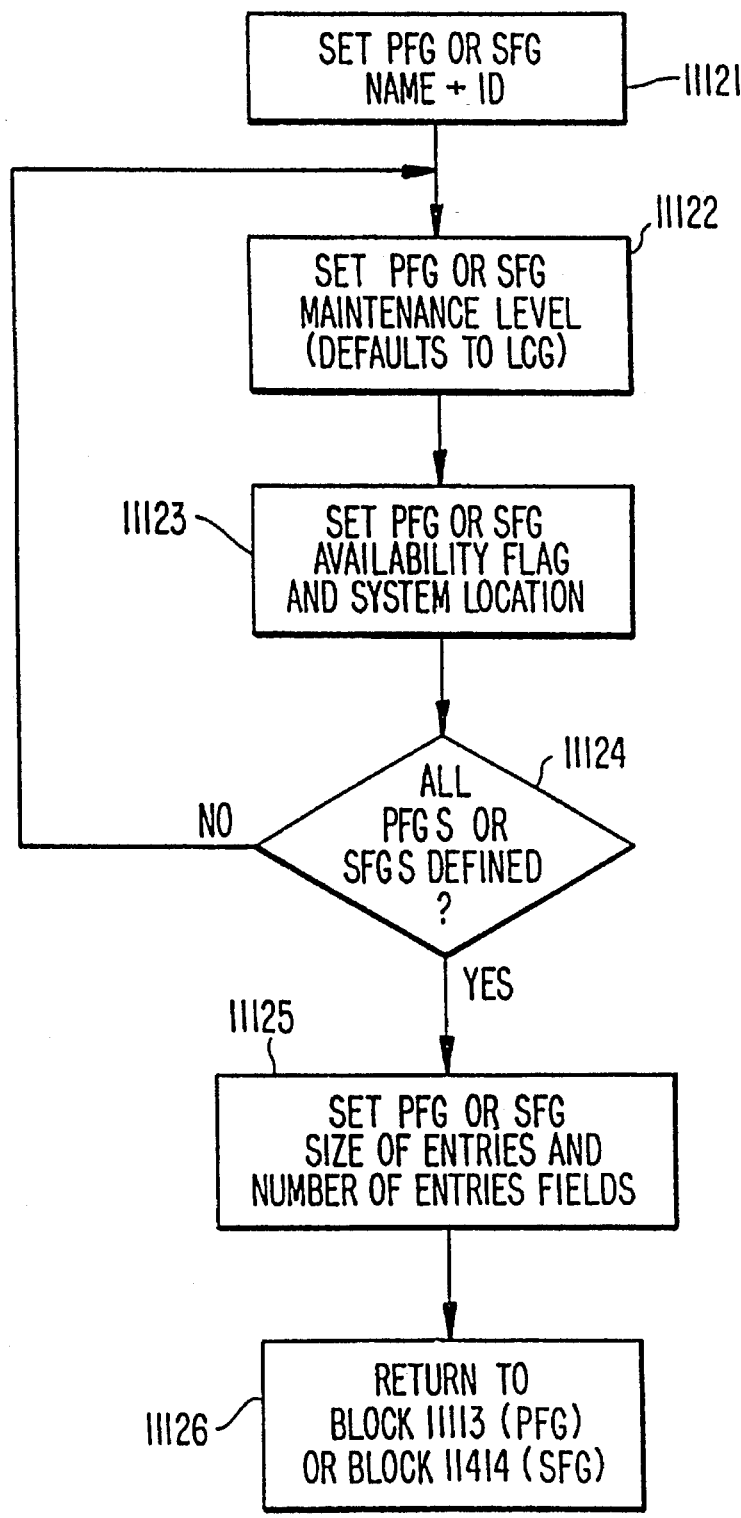

FIG. 20 shows how a PFG list is defined in block 11120 in more detail. Block 11121 asks the program developer for the PFG name and ID. This information is placed in fields 2550 and 2552 of FIG. 12. Block 11122 asks the program developer for the PFG maintenance level. This information is placed in fields 2553 and 2554 of FIG. 12. Block 11124 asks if the user wants to define any other PFGs to go in this list. If not, blocks 11121–11123 are repeated until all the PFGs are defined in the list. When all the PFGs are defined in the list, block 11125 sets the PFG size of entry and number of entries fields 2541 and 2543 of FIG. 12. Block 11126 returns to block 21113 of FIG. 19.

Figure 22:
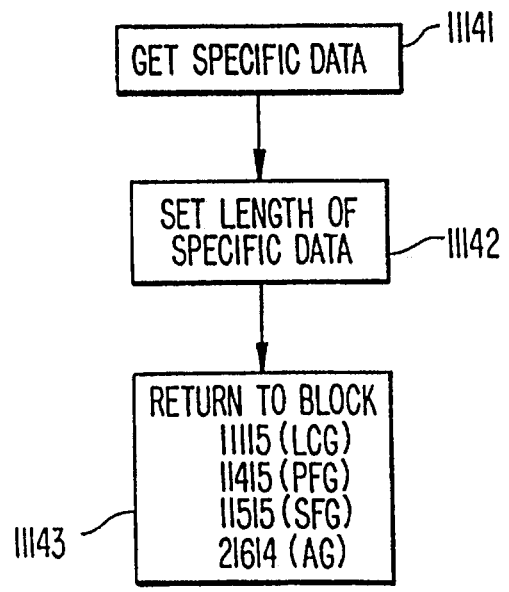

The details of how block 11140 defines the LCG specific data are shown in FIG. 22. Block 11141 asks the program developer for the LCG specific data. The LCG specific data is placed in field 2522 of FIG. 12. Block 11142 sets the length of the LCG specific data based on the contents of field 2522. The length is placed in field 2521 of FIG. 12. Block 11143 returns to block 11115 of FIG. 19.

Figure 23:
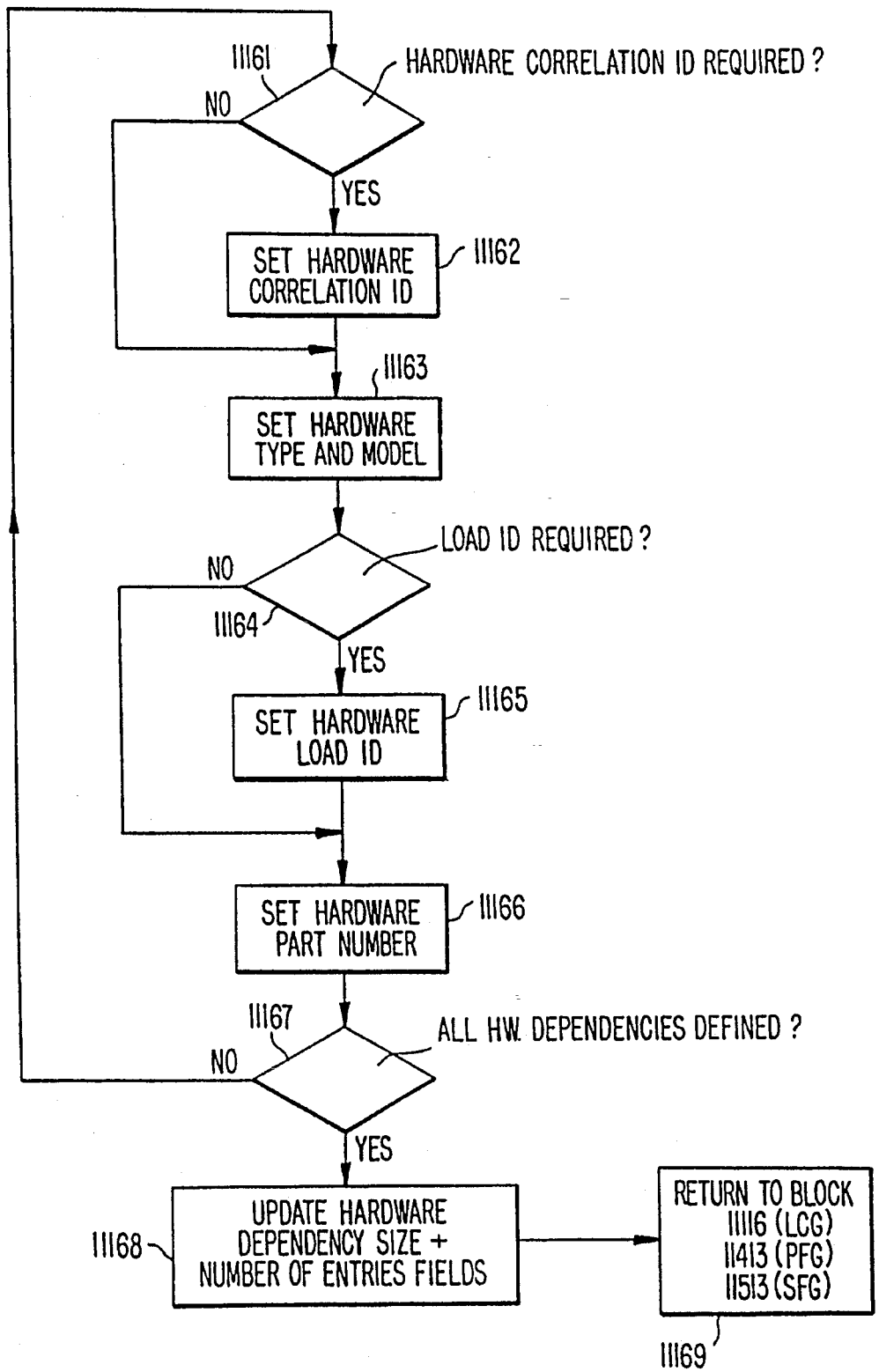

The details on how block 11160 defines an LCG hardware dependency list is shown in more detail in FIG. 23. Decision block 11161 asks the program developer whether a hardware correlation ID is required for this hardware dependency list. If so, the hardware correlation ID is placed in field 332 of FIG. 8 as shown in block 11162. Block 11163 prompts the program developer for the hardware type and model number. This information is placed in fields 333 and 335 of FIG. 8. Decision block 11164 asks the program developer whether a load ID is required for this entry in the hardware dependency list. If so, the hardware load ID is placed in field 336 of FIG. 8 as shown in block 11165. If not, block 11165 is skipped. Block 11166 prompts the program developer for the hardware part number. This information is placed in field 337 of FIG. 8. Decision block 11167 asks if there are any more hardware dependencies to go on this list. If so, blocks 11161–11166 are repeated until all of the hardware dependencies are included on this list. When all the hardware dependencies are included on this list, block 11168 updates the size of hardware dependency list field 338 and the number of entries field 331 of FIG. 11 to include the new information. Block 11169 returns control to block 11116 of FIG. 19.

Figure 24:
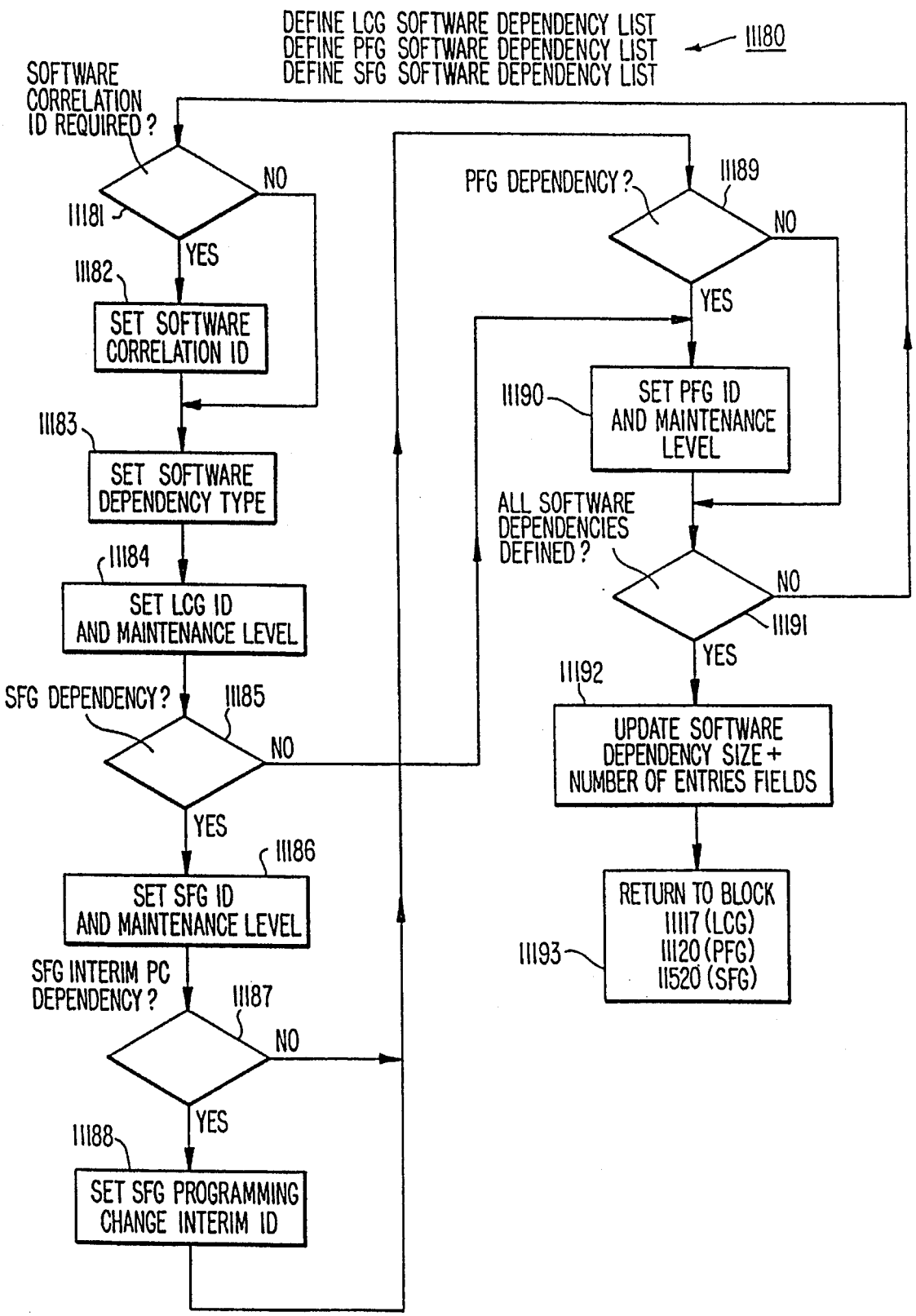

The details of how block 11180 defines the LCGs software dependency list is shown in FIG. 24. Block 11181 asks the program developer whether a software correlation ID is required for this software dependency list. If so, the software correlation ID is placed in field 364 of FIG. 8, as shown in block 11182. If not, block 11182 is skipped. Block 11183 asks the program developer for the software dependency type. This information is placed in field 366 of FIG. 8. Block 11184 asks the program developer for the LCG ID and maintenance level for the software dependent upon. This information is placed in fields 367–369 of FIG. 8. Block 11185 asks the user whether the software dependent upon is an SFG RU. If so, the program developer is prompted in block 11186 for the SFG ID and maintenance level. This information is placed in fields 373–375 of FIG. 8.

Decision block 11187 asks if there are any dependencies on an SFG interim program change level. If so, block 11188 prompts the program developer for the SFG programming change interim ID. This information is placed in field 376 of FIG. 8. If not, block 11188 is skipped. Block 11189 asks the program developer whether there are any dependencies on an PFG RU. If so, the program developer is prompted for the PFG ID and maintenance level. This information is placed in fields 370–372 of FIG. 8 as shown in block 11190. If not, block 11190 is skipped. Block 11191 asks the program developer whether all software dependencies have been defined. If not, control returns back to the beginning of FIG. 24 and blocks 11181–11190 are repeated until all software dependencies have been defined. Once all software dependencies have been defined, block 11192 updates the software dependency size field 361 and the number of entries field 362 of FIG. 8. Block 11193 returns back to block 11117 of FIG. 19.

Figure 25B:
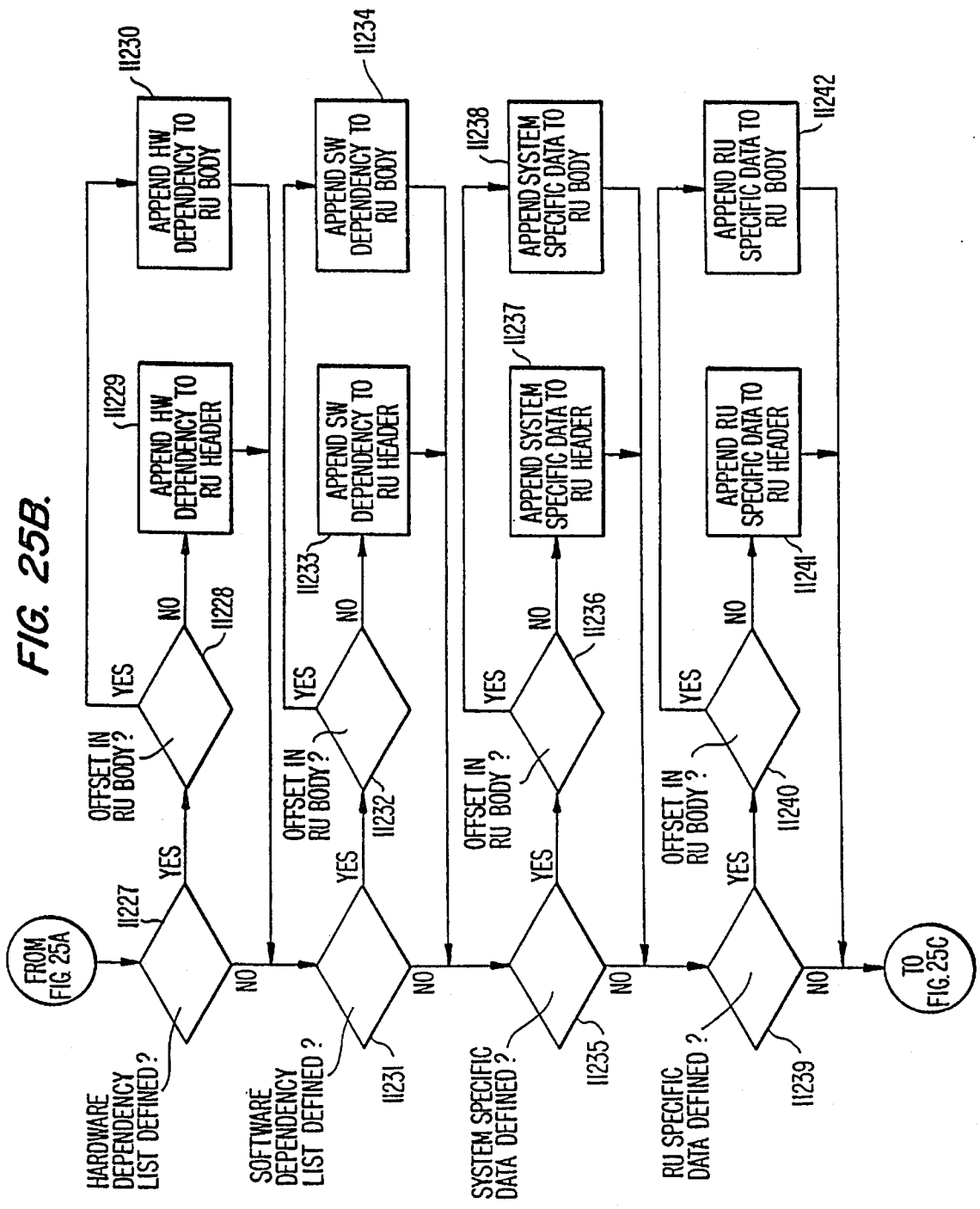
Figure 25C:
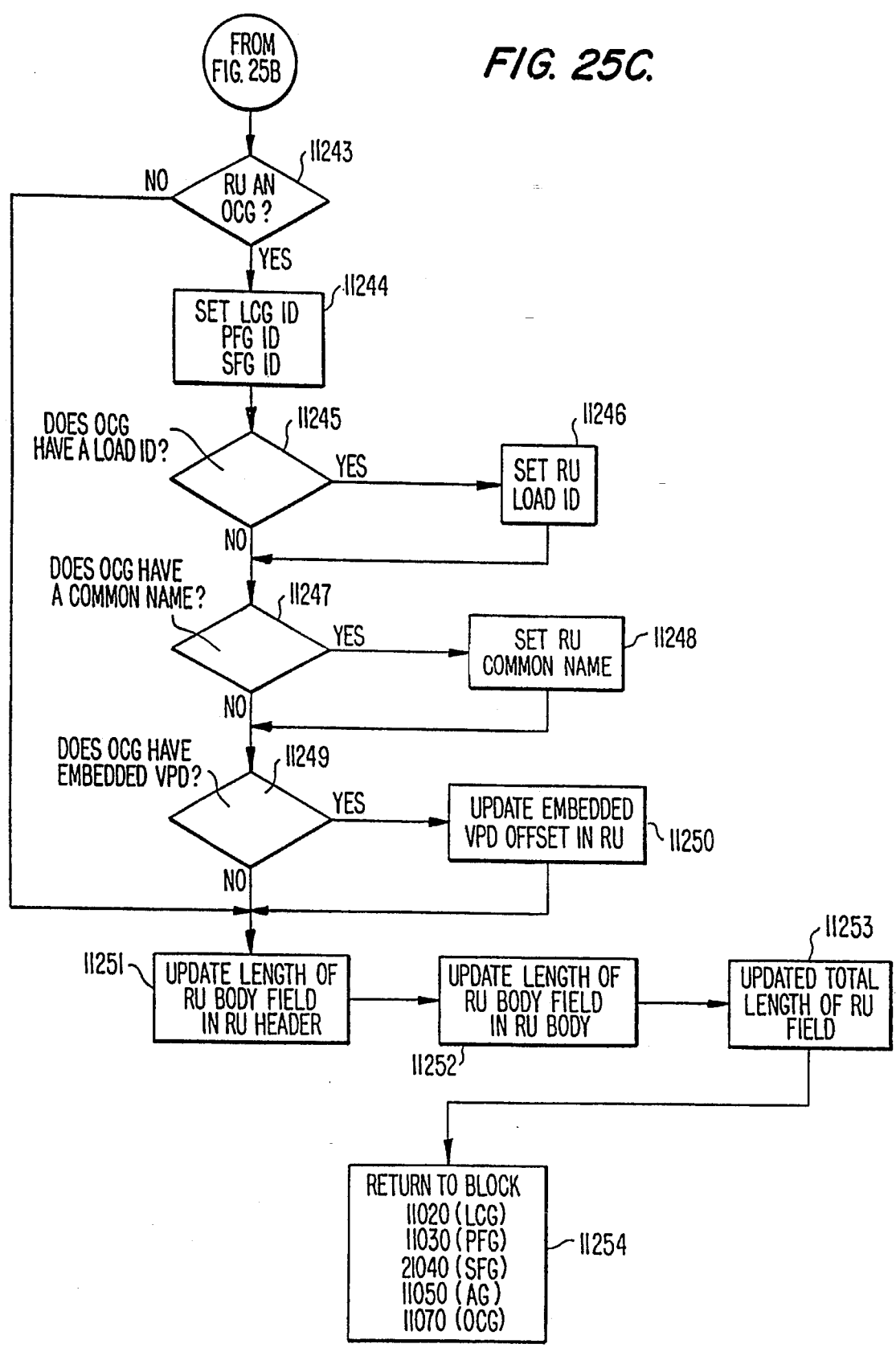
Figure 26:
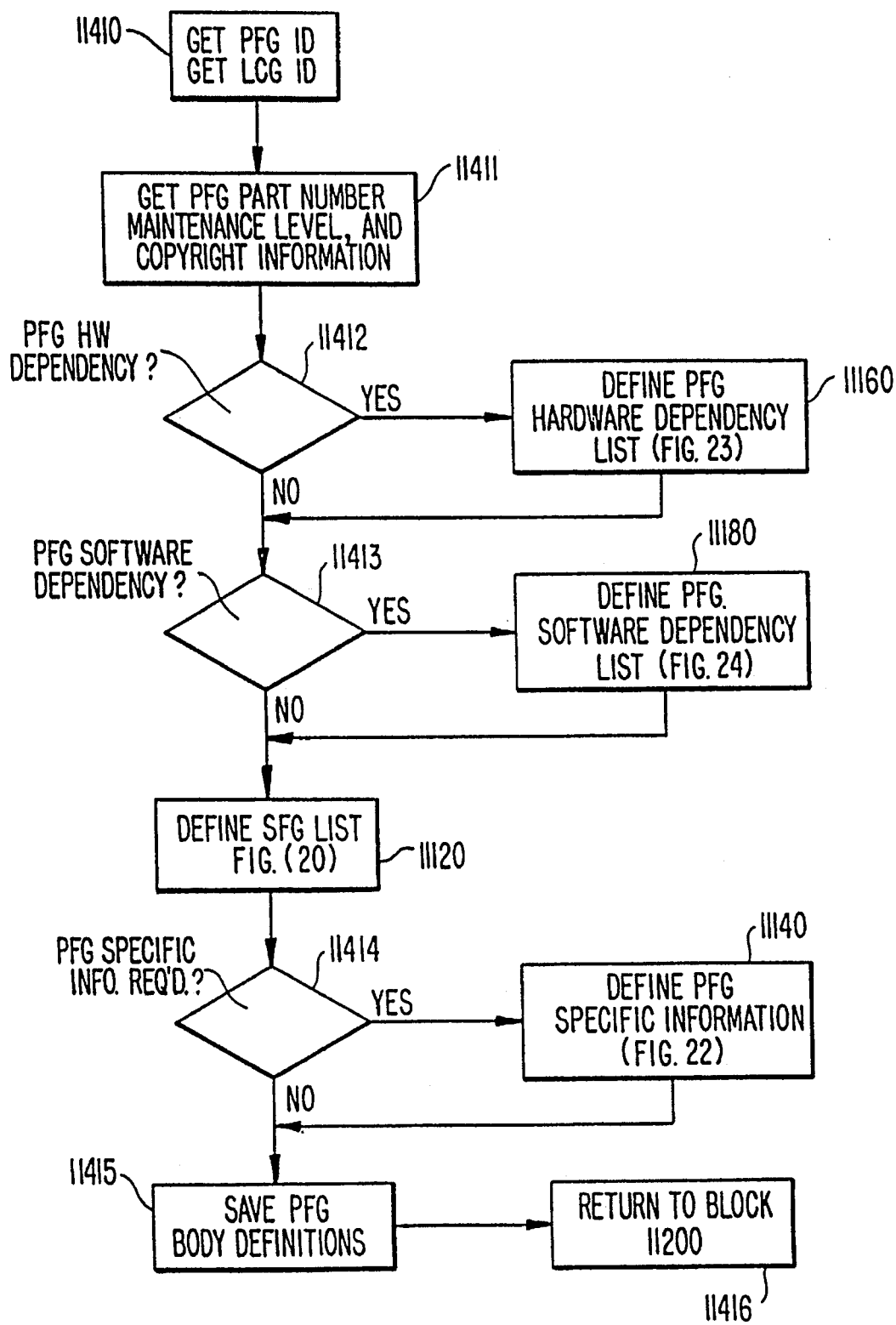

The details of how block 11200 of FIG. 18 defines an LCG header is Shown in FIG. 25A–C. Note that the discussion of how an LCG header is defined is the same as the discussion of how PFG header, an SFG header, an AG header or an OCG header is defined in FIG. 18. Block 11211 prompts the program developer for the name and reference ID of this RU. This information is placed in fields 231 and 232 of FIG. 7. Block 11212 prompts the program developer for the version level and release level of the RU. This information is placed in fields 249 and 250 of FIG. 7. Block 11213 prompts the program developer for the control information and development information for this RU. This information is placed in blocks 242 and 243 of FIG. 7. Block 11214 sets the name of the system area that contains this RU. This information is placed in field 266 of FIG. 7. Block 11215 sets the date and the time of which this particular RU was created. This information is placed in fields 244 and 246 of FIG. 7.

Block 11219 asks if this RU is an LCG RU. If so, block 11220 sets the LCG ID in field 234 of FIG. 7. Block 11221 retrieves the LCG body definition as defined in block 11100.

Block 11222 asks if this RU is a PFG RU. If so, the LCG ID and the PFG ID are set in fields 234 and 236 of FIG. 7 as shown in Block 11223. The PFG body definition defined in block 11400 is retrieved in block 11224.

Block 11225 asks if this RU is an SFG RU. If so, block 11226 sets the LCG, PFG and SFG IDs associated with this SFG in fields 234, 236, and 237 of FIG. 7.

Block 11255 then gets the SFG body definition as defined in block 11500. Block 11227 (FIG.25B) asks if a hardware dependency list has been defined for this RU. If so, block 11228 determines whether the hardware dependency offset is in the RU body or the RU header. The RU dependency offset can be in either the RU body or the RU header but not both under the preferred embodiment. If the hardware dependency offset list is in the RU body, the hardware dependency list is appended to the RU body in block 11230. If the hardware dependency offset list is in the RU header, the hardware dependency list is appended to the RU header in block 11229. In the latter case, information is placed in field

263 of FIG. 7 to show the offset to the hardware dependency list.

Block 11231 asks whether a software dependency list has been defined for this RU. If so, block 11232 asks whether the software dependency offset is contained in the RU body or the RU header. If the software dependency offset is in the RU body, the software dependency list is appended to the RU body in block 11234. If the software dependency list offset is in the RU header, the software dependency list is appended to the RU header in block 11233. Information concerning this offset is placed in field 264 of FIG. 7.

Block 11235 asks whether system specific data has been defined for this RU. If so, block 11236 asks whether the offset to this system specific data is contained in the RU body or the RU header. If the offset for the system specific data is contained in the RU body, the system specific data is appended to the RU body in block 11238. If the system specific data offset is contained in the RU header, the system specific data is appended to the RU header in block 11237. Data concerning this offset is placed in field 262 of FIG. 7.

Block 11239 asks if RU specific information information is defined for this RU. If so, block 11240 asks whether the offset to this RU specific information is contained in the RU body or the RU header. If the RU specific information offset is in the RU body, the RU specific data is appended to the RU body in block 11242. If the RU specific information offset is contained in the RU header, the RU specific information is appended to the RU header as shown in block 11241. Information about this offset is placed in field 265 of FIG. 7.

Block 11243 (FIG. 25C) asks if this RU is an OCG RU. If so, block 11244 sets the LCG, PFG and SFG IDs for this particular OCG. This information is placed in fields 234, 236, and 237 of FIG. 7. Block 11245 asks whether the OCG has a load ID. If so, the OCG load ID is placed in fields 233 of FIG. 7 as shown in block 11246.

Block 11247 asks if this OCG has a common name. If so, the common name for the OCG is placed in field 254 of FIG.

7, as shown in block 11248. Block 11249 asks if the OCG body has any embedded vital product data in it. If it does, field 267 of FIG. 7 is updated to offset to the portion of the OCG body in which the embedded vital product data is contained as shown in block 11250. Block 11251 updates the total length of the RU body in fields 222 of FIG. 7. Block 11252 updates the length of the RU body in field 1420 of FIG. 9 if this is an AG RU, field 2420 of FIG. 11 if this is an LCG RU, field 3420 of FIG. 13 if this is a PFG RU, and field 4420 of FIG. 15 if this is an SFG RU. Block 11253 calculates the total length of the RU and places this information in field 221 of FIG. 7. The total length of the RU includes the header portion and the body portion. Block 11254 returns to block 11020.

The details on how block 11400 of FIG. 18 defines a PFG body is shown in more detail in FIG. 26. Block 11410 prompts the program developer for the ID of this PFG and also the ID of the LCG that owns this PFG. This information is placed in fields 3432 and 3434 of FIG. 13. Block 11411 prompts the program developer for the PFG part number, maintenance level, and copyright information. This information is placed in fields 3435–3450 of FIG. 13. Block 11412 asks the program developer whether this PFG is dependent on any other hardware. If yes, a hardware dependency list is defined as shown in Block 11160. Block 11160 is shown in more detail in FIG. 23, and has already been discussed. Block 11413 asks the program developer whether this PFG has any software dependencies. If the answer is yes, block 11180 defines a software dependency list for this PFG. Details of block 11180 are shown in FIG. 24, and has already been discussed. Block 11120 defines an SFG list of all the SFGs that link to this PFG. Block 11120 is shown in more detail in FIG. 20 and has already been discussed. Block 11414 asks the program developer whether there is any PFG specific information required. If yes, PFG specific information is defined in block 11140. Details of block 11140 are shown in FIG. 22, and has already been discussed. An offset to this PFG specific information is placed in field 3464 of FIG. 13. Block 11415 saves this PFG body definition created in FIG. 26. Block 11416 continues the flow of operation to block 11200 as shown in FIG. 25 where a PFG header is defined.

Figure 27:
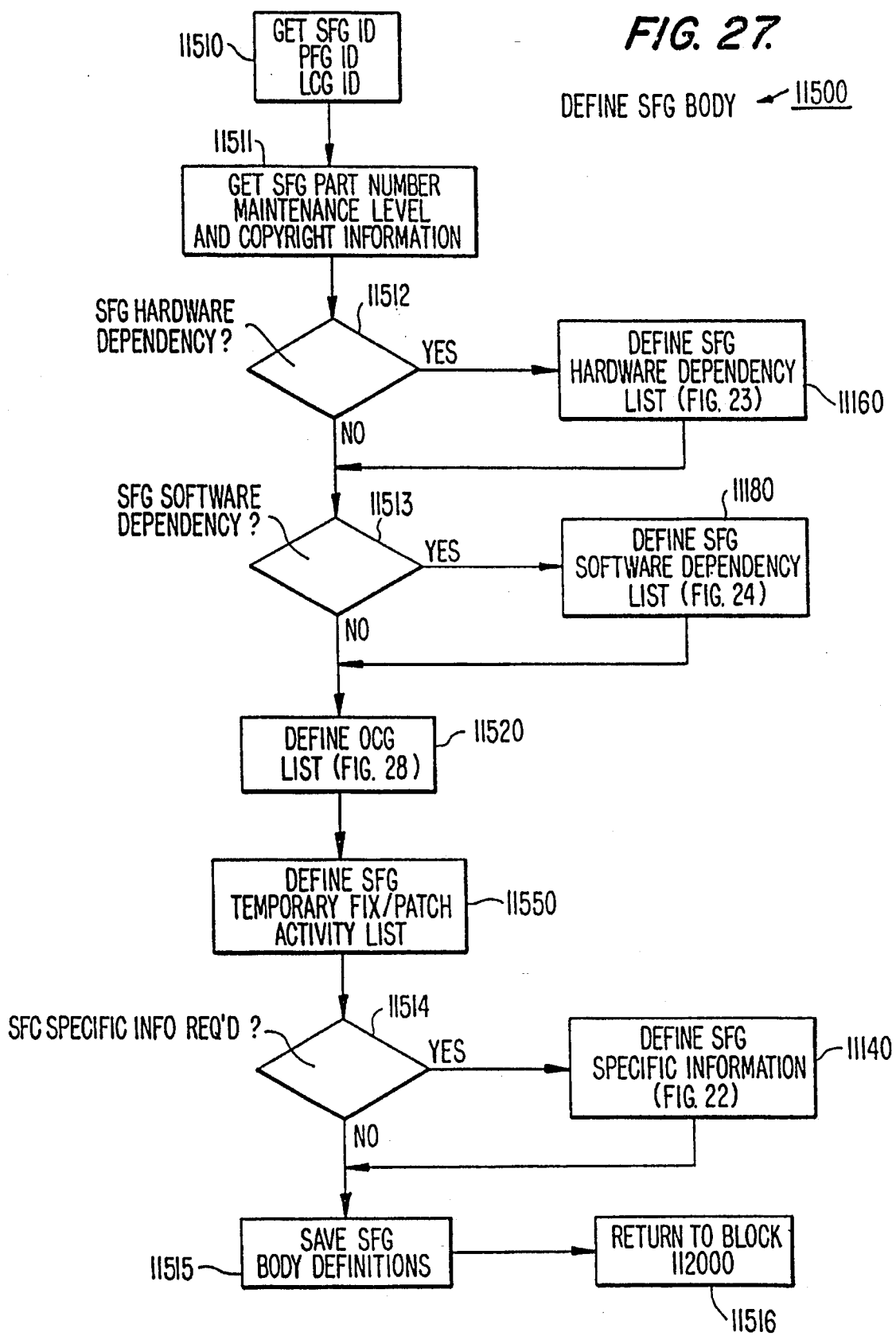
Figure 28:
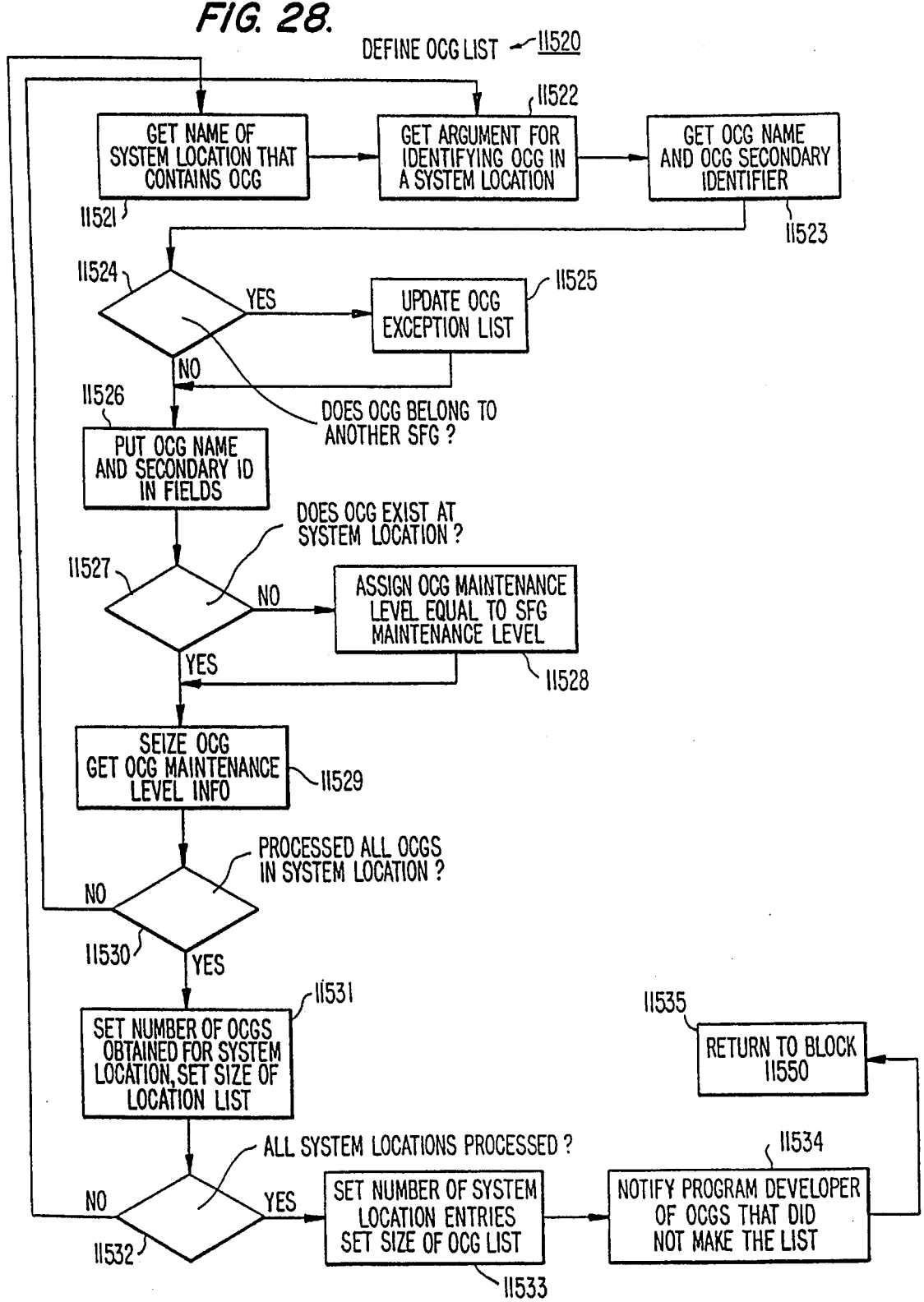

Details of how block 11500 defines an SFG body as shown in FIG. 18 will now be described in FIG. 27. Block 11510 prompts the program developer for the SFG ID and also for the LCG ID and the PFG ID that own this particular SFG. This information is placed in fields 4431, 4433, and 4434 of FIG. 15. Block 11511 prompts the program developer for the SFG part number, maintenance level and copyright information. This information is placed in fields 4435–4440 of FIG. 15. Block 11512 asks the program developer if this SFG is dependent upon any other hardware. If the answer is yes, an SFG hardware dependency list is defined in block 11160. Details of block 11160 are shown in FIG. 23, and has been discussed. Block 11513 asks the program developer if there are any software dependencies for this particular SFG. If the answer is yes, a software dependency list is built for this SFG in block 11180. Details of block 11180 are shown in FIG. 24 and has already been discussed. Block 11520 builds an OCG list that links this SFG to all of its OCGs. Details of how block 11520 builds this OCG list are shown in FIG. 28 and will be discussed later. An offset to this OCG list is placed in field 4461 of FIG. 15. Block 11550 builds an SFG temporary fix/patch activity list for this SFG. This list is contained in fields 4561–4570 of FIG. 16. An offset to this list is placed in field 4462 of FIG. 15. Block 11514 asks if any SFG specific information is required. If the answer is yes, SFG specific information is built in block 11140. Block 11140 is shown in more detail in FIG. 22, and has already been discussed. The SFG specific information is placed in field 4521, the length of the SFG specific information is placed in field 4520 and the offset to the SFG specific information is placed in field 4463 of FIG. 15. Block 11515 saves the SFG body definition as defined in FIG. 27. Block 11516 continues the flow of control to block 11200 where an SFG header is defined.

Details of how block 11520 defines an OCG list is shown in FIG. 28. Block 11521 prompts the program developer for the name of the'system location that contains the OCG. This information is placed in field 4544 of FIG. 16. Block 11522 gets the argument for identifying this OCG in a system location. This can be done either by asking for all of the OCGs in a location, all of the OCGS with a certain name at a location, or have all these OCGs be manually entered.

Block 11523 asks for the name of this OCG and the OCG secondary identifier. Block 11524 asks if this OCG belongs to another SFG. If the answer is yes, the OCG exception list is updated in block 11525. An OCG should only belong to one SFG. Block 11526 puts the name of the OCG and the secondary ID of the OCG in fields 4547 and 4548 of FIG. 16. Block 11527 asks if this OCG exists at a system location. If not, block 11528 assigns the maintenance level information to be equal to the SFG definition maintenance level information that owns this particular OCG. Therefore, the information in field 4436 of FIG. 15 is copied into field 4549 of FIG. 16 and the maintenance information in field 4437 of FIG. 15 is copied into field 4550 of FIG. 16.

Block 11529 asks for the OCG maintenance level information. This information is placed in fields 4549–4554. Block 11530 asks if all the OCGs in the system location have been processed. If not, control returns back to block 11552. If all of them have been processed, block 11531 sets the size of this system location list in field 4543 of FIG. 16 and the number of the OCG entries in the list in field 4546 in FIG. 16. Block 11532 asks if all the system locations have been processed. If not, control returns all the way up to block 11521. If all system locations have been processed, block 11533 sets the size of the OCG list in field 4541 of FIG. 16 and a number of system location entries in field 4542 of FIG. 16. Block 11534 notifies the user of the OCGs that did not make the list. Block 11535 returns control back to block 11550 in FIG. 27.

After a program developer has defined one or several program packages he can use packaging tool 17000 to display the program packages on his display screen. If, for example, program developer 21 defines the five program packages contained in library 30 as shown in FIG. 2 using define program package tool 11000, the screen displayed to program developer 21 would be as shown in FIG. 31. The short description is displayed in column 17050. The LCG ID is displayed in Column 17100. The PFG ID, if present, is displayed in column 17200. The SFG ID, if present, is displayed in column 17300. The name of the RU is displayed in column 17400. The RU type is displayed in column 17500. The name of the system location where the RU resides is displayed in column 17600. Column 17700, 17800, and 17900 display the available, installed, and enable flags for the RU, respectively. All three of these flags must be set on before a user could use the function of the RU. Note that some of the RUs are only available, while others are available and installed, and still others are available, installed and enabled.

Referring again to FIG. 1, application packaging tools 90 can be used to allow application developer 26 to construct an application package. Applicant developer 26 constructs an application package by selecting some of the program packages contained in library 30. In addition, some of the primary and secondary functions of the program packages are selected while others are omitted. Application developer 26 uses application packaging tools 90 to accomplish the above by constructing an application containing five levels: AG, LCG, SFG, PFG and OCG. Application packaging tools 90 consists of software that runs on a general purpose computer such as a personal computer suitably programmed as shown in FIGS. 17–34.

FIG. 32 shows a menu screen of the possible packaging tools application developer can use to create an application package. Packaging tool 21000 defines an application package. Packaging tool 24000 selects the primary and secondary functions of each program package to be included in the application package. Packaging tool 27000 displays the application package created. Packaging tool 21000 is very similar to packaging tool 11000 discussed above. Packaging tool 21000 has, in addition to the functions of tool 11000, a few more functions available to an application developer generally not made available to a program developer. These additional functions are shown in FIGS. 18–30 with reference numerals of 21000–21999 and will now be discussed.

Referring first to FIG. 18, decision block 21040 asks the application developer whether he wants to define an AG. If so, an AG body is defined in block 21600. Block 21600 is shown in more detail in FIG. 29. The AG header is then defined in more detail in block 11200 as previously discussed.

Referring now to FIG. 19, block 21113 asks the application developer whether AG information is required to go with this LCG. If so, an AG list is defined in block 21130. Block 21130 is shown in more detail in FIG. 21 and will be described next.

Figure 21:
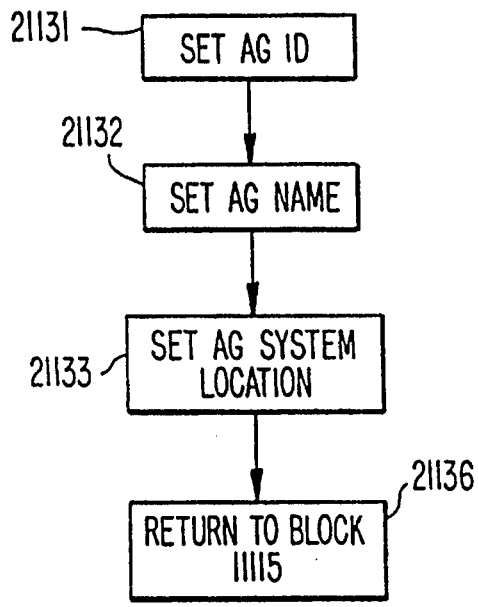

Block 21130 defines an AG list and is shown in more detail in FIG. 21. Block 21131 prompts the application developer for the ID of the AG. This information is placed in field 2531 of FIG. 12. Block 21132 prompts the application developer for the name of the AG. This information is placed in field 2532 of FIG. 12. Block 21133 prompts the application developer for the location in system memory where the AG RU is located. This information is placed in field 2533 of FIG. 12. Block 21136 returns to block 21115 of FIG. 19.

Referring now to FIG. 25A, block 21216 asks if this RU is an AG RU. If so, the AG ID for this RU is set in field 234 of FIG. 7 as shown in Block 21217. Block 21218 retrieves the AG body definition as defined in block 21600 as shown in FIG. 29.

Figure 29:
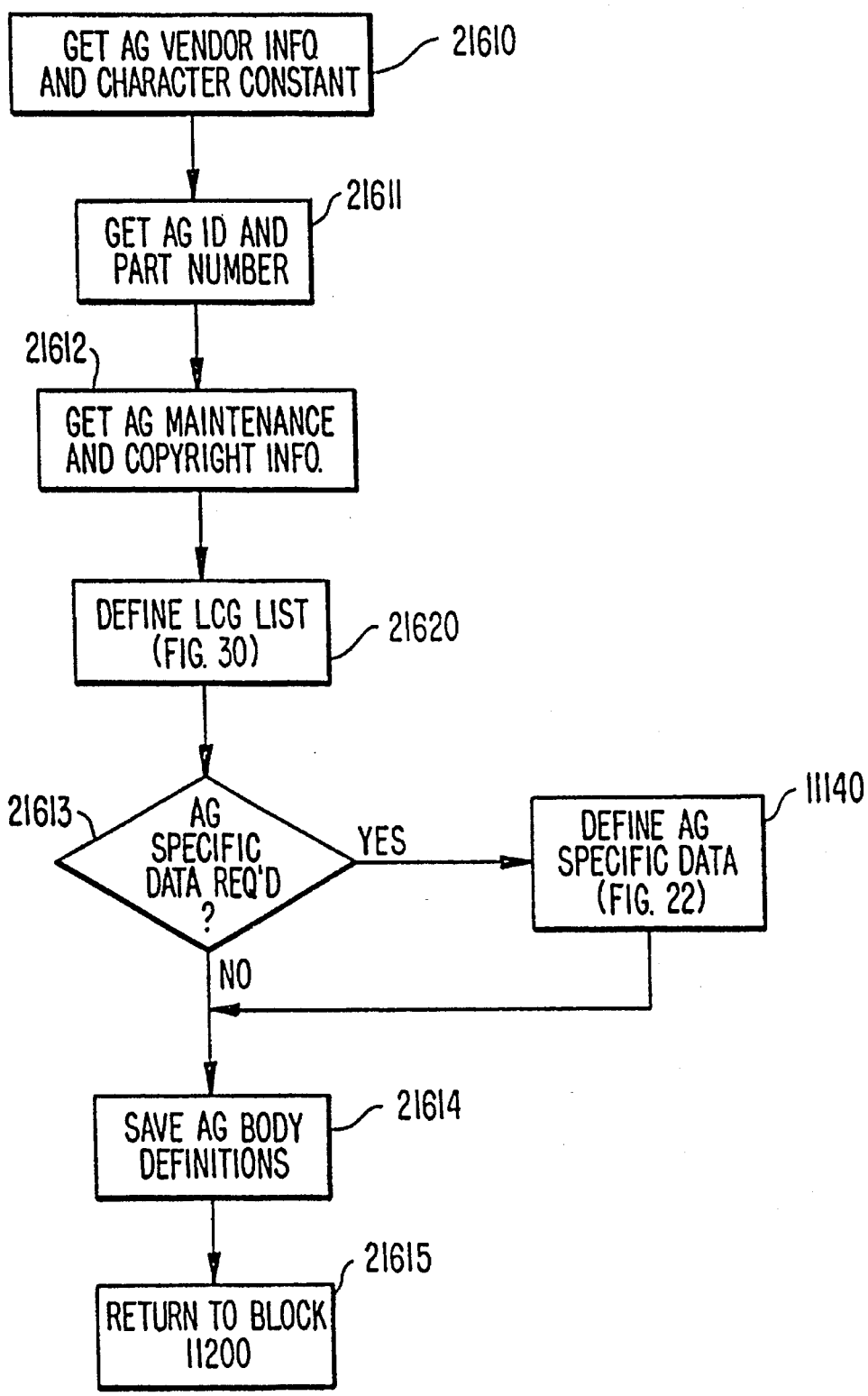

The details on how block 21600 defines the AG body are shown in FIG. 29. Block 21610 prompts the application developer for the AG vendor information and character constant. This information is placed in fields 1431–1439 of FIG. 9. Block 21611 prompts the application developer for the AG ID and the AG part number. This information is placed in fields 1443 and 1444 of FIG. 9. Block 21612 prompts the application developer for the AG maintenance and copyright information. This information is placed in fields 1445–1449 of FIG. 9. Block 21620 defines the LCG list for all of the LCGs linked to this AG.

Figure 30:
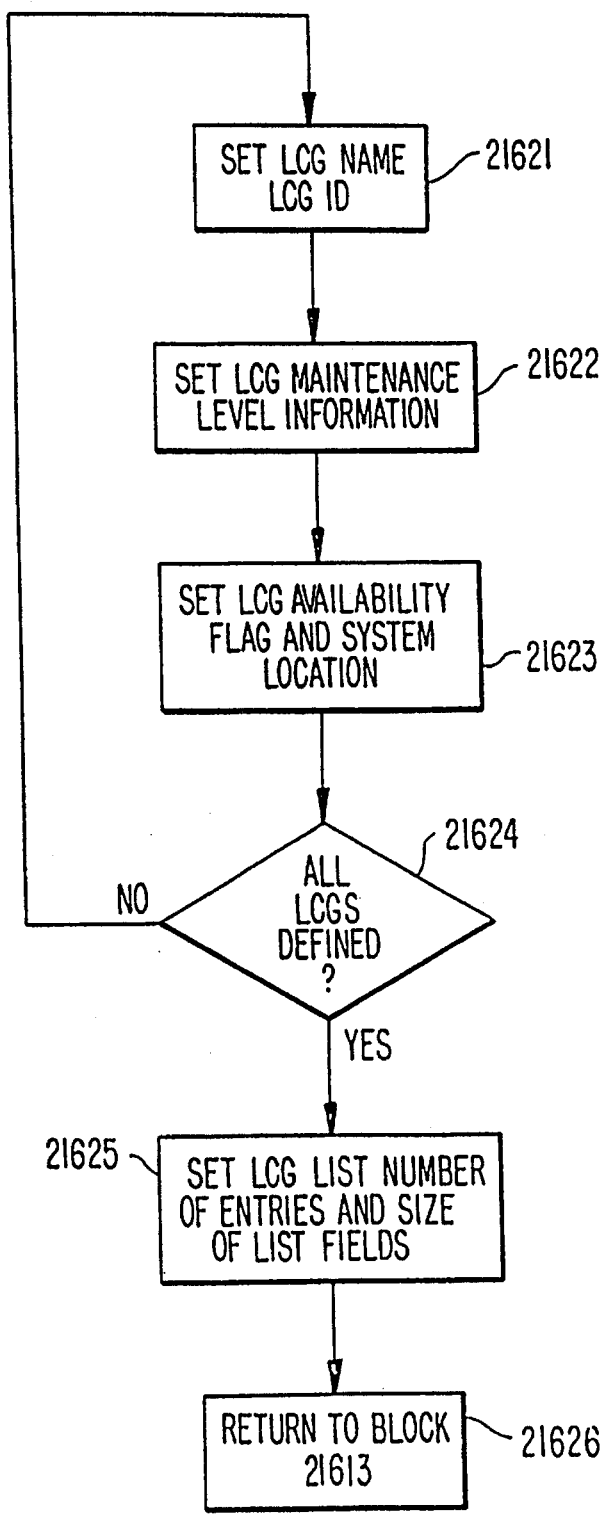

Details on how block 21620 defines an LCG list are shown in FIG. 30 and will be discussed later. Block 21613 prompts the program developer to see if any AG specific information is required. If so, AG specific information is defined in block 11140. Details of how block 11140 defines the AG specific data is shown in FIG. 22, and has already been discussed. Block 21614 saves the AG body definition created in FIG. 29. Block 11615 continues the flow of control to block 11200 where an AG header is defined. Details on how block 11200 defines an AG header are shown in FIG. 25 and has already been discussed.

Details on how block 21620 defines an LCG list are shown in FIG. 30. Block 21621 prompts the application developer for the name and the ID of the LCG. This information is placed in blocks 1552 and 1554 of FIG. 10. Block 21622 asks the program developer for the LCG maintenance level information. This information is placed in field 1555 and 1556 of FIG. 10. Block 21623 sets the LCG availability field and prompts the program developer for the system location that contains the LCG. This information is placed in fields 1546 and 1550 of FIG. 10. Block 21624 asks if all of the LCGs for the list have been defined. If not, blocks 21621–21623 are repeated. When all of the LCGs have been defined, block 21625 sets the number of LCG entries in field 1541 and the size of the LCG list in field 1543 of FIG. 10. Block 21626 returns back to block 21613 of FIG. 29.

After the application developer has defined the application package by selecting the LCGs to be included in the package using tool 21000, the application developer then uses tool 24000 to select the application package functions. If, for example, application developer 26 wanted to create application package 61 for user 41 as shown in FIG. 1, FIG. 33 would display a menu of the selected program packages. Note that columns 24050–24900 are the same as columns 17050–17900 of FIG. 31. Column 24010 provides a place for the application developer to select the desired primary functions and secondary functions for the application package. In order to define application package 61 of FIG. 3, an application developer would place an X in column 24010 for each selected primary function and secondary function shown in FIG. 3. Primary functions or secondary functions not selected are removed from the bodies of the LCGs and PFGs before the application package is sent to the user.

Packaging tool 27000 displays the application package created by tools 21000 and 24000. FIG. 34 shows the display the application developer would see after creating application package 61 of FIG. 3.

As has been discussed, the preferred embodiment of the information contains five levels, as shown in FIG. 4. However, not all these levels are necessary to still be within the scope of this invention. An alternate embodiment has been contemplated and includes a program package of just two levels: loadable code group level 2000 and operational code group level 5000. Although this embodiment is not as close a fit to a user's requirements as the five level scheme of the preferred embodiment, many of the advantages of the preferred embodiment are still apparent. In this embodiment, FIGS. 9, 10, 13, 14, 15 and 16 are not included. Field 2463 of FIG. 11 would be "Offset to OCG list" and field 2465 would be "Reserved". Likewise, the PFG list shown in FIG. 12 would be replaced by an OCG list and Select/Omit field 2544 would be "Reserved". Fields 2531–2533 would not be included in this alternate embodiment. Likewise, many of the sections of the flowcharts of FIGS. 18–30 are not necessary to define a program package with only 2 levels.

While the invention has been described with respect to preferred and alternate embodiments, it will be understood by those skilled in the art that various changes in detail may be made therein without departing from the spirit, scope and teaching of the invention. Accordingly, the herein discussed is to be limited only as specified in the following claims.

What is claimed is:

1. A computer program embodied on a computer-readable medium having a hierarchical software management structure, said computer program comprising:

a first replaceable unit further comprising a first header and first body, said first header comprising first identification data, said first header further comprising a first list of hardware on which said first replaceable unit is dependent for proper operation;

a second replaceable unit further comprising a second header and a second body, said second header comprising second identification data;

said first body comprising said second identification data, thereby allowing said first replaceable unit to link to said second replaceable unit in a hierarchical fashion;

said second body comprising operational code necessary to run said computer program;

said first body contains no operational code necessary to run said computer program; and said first header further comprising a description of the function of said operational code.

2. The computer program of claim 1, wherein said second header further comprises a second list of hardware on which said second replaceable unit is dependent for proper operation.

3. The computer program of claim 1, where in said first header further comprises a first list of software on which said first replaceable unit is dependent for proper operation.

4. The computer program of claim 1, wherein said second header further comprises a second list of software on which said second replaceable unit is dependent for proper operation.

5. The computer program of claim 1, wherein said first body further comprises a plurality of identification information corresponding to a plurality of replaceable units.

6. The computer program of claim 1, wherein said first header further comprises first maintenance information.

7. The computer program of claim 1, where said second header further comprises second maintenance information.

8. The computer program of claim 6, wherein said first maintenance information further comprises an identification of a machine instruction set compatible with said operational code of said computer program.

9. A computer program embodied on a computer-readable medium having a hierarchical software management structure, said computer program comprising:

an application group level comprising a first replaceable unit, said first replaceable unit further comprising a first header and a first body, said first header comprising first identification data, said first header further comprising a first list of hardware on which said first replaceable unit is dependent for proper operation;

a loadable code group level comprising a second replaceable unit, said second replaceable unit further comprising a second header and a second body, said second header containing second identification data;

a primary functional group level comprising a third replaceable unit, said third replaceable unit further comprising a third header and a third body, said third header containing third identification data;

a secondary functional group level comprising a fourth replaceable unit, and fourth replaceable unit further comprising a fourth header and a fourth body, said fourth header containing fourth identification data;

an operational code group level comprising a fifth replaceable unit, said fifth replaceable unit further comprising a fifth header and a fifth body, said fifth header containing fifth identification data;

said first body further comprising said second identification data, thereby allowing said first replaceable unit to link to said second replaceable unit in a hierarchical fashion;

said fifth body comprising operational code necessary to run said computer program;

said first body, said second body, said third body, and said fourth body contains no operational code necessary to run said computer program; and said first header, said second header, said third header and said fourth header containing descriptions of the function of said operational code.

10. The computer program of claim 9, wherein said second body comprises said third identification data, thereby allowing said second replaceable unit to link to said third replaceable unit in a hierarchical fashion.

11. The computer program of claim 10, wherein said third body comprises said fourth identification data, thereby allowing said third replaceable unit to link to said fourth replaceable unit in a hierarchical fashion.

12. The computer program of claim 11, wherein said fourth body comprises said fifth identification data, thereby allowing said fourth replaceable unit to link to said fifth replaceable unit in a hierarchical fashion.

13. A computer program embodied on a computer-readable medium having a hierarchical software management structure, said computer program comprising:

a first replaceable unit further comprising a first header and first body, said first header comprising first identification data;

a second replaceable unit further comprising a second header and a second body, said second header comprising second identification data;

a third replaceable unit further comprising a third header and a third body, said third header comprising third identification data;

said first body comprising said second identification data and said third identification data, thereby allowing said first replaceable unit to link to said second replaceable unit and said third replaceable unit in a hierarchical fashion;

said second body comprises first operational code necessary to run a first portion of said computer program on a first computer using a first machine instruction set; and said third body comprises second operational code necessary to run a second portion of said computer program on a second computer incompatible with said first computer, said second computer using a second machine instruction set.

* * * * *